(12) United States Patent
Chun et al.

(10) Patent No.: US 12,000,027 B2
(45) Date of Patent: Jun. 4, 2024

(54) BIMETALLIC MATERIALS COMPRISING CERMETS WITH IMPROVED METAL DUSTING CORROSION AND ABRASION/EROSION RESISTANCE

(71) Applicant: ExxonMobil Chemical Patents Inc., Baytown, TX (US)

(72) Inventors: Changmin Chun, Raritan, NJ (US); Ning Ma, Whitehouse Station, NJ (US); Jorge J. Perdomo, Kingwood, TX (US); John S. Coleman, Houston, TX (US); Larry L. Iaccino, Seabrook, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 11 days.

(21) Appl. No.: 17/772,077

(22) PCT Filed: Oct. 29, 2020

(86) PCT No.: PCT/US2020/057992
§ 371 (c)(1),
(2) Date: Apr. 26, 2022

(87) PCT Pub. No.: WO2021/087133
PCT Pub. Date: May 6, 2021

(65) Prior Publication Data
US 2022/0380871 A1    Dec. 1, 2022

Related U.S. Application Data

(60) Provisional application No. 62/929,202, filed on Nov. 1, 2019.

(30) Foreign Application Priority Data

Dec. 20, 2019 (EP) .................................... 19218544

(51) Int. Cl.
*C22C 29/00* (2006.01)
*B23K 26/34* (2014.01)
(Continued)

(52) U.S. Cl.
CPC ............ *C22C 29/005* (2013.01); *B23K 26/34* (2013.01); *C22C 30/02* (2013.01);
(Continued)

(58) Field of Classification Search
CPC ..... C22C 29/02; C22C 19/053; C22C 19/055; C22C 29/005
See application file for complete search history.

(56) References Cited

U.S. PATENT DOCUMENTS

2007/0163382 A1    7/2007  Chun et al. ................. 75/238
2012/0177933 A1    7/2012  Bangaru et al. ............ 428/457
(Continued)

FOREIGN PATENT DOCUMENTS

| CN | 100359031 | 1/2008 | ............ C22C 29/10 |
| JP | 2015/224385 | 12/2015 | ............ B23K 10/02 |
| WO | 2004/104250 | 12/2004 | ............ C22C 29/06 |

*Primary Examiner* — Adam Krupicka
(74) *Attorney, Agent, or Firm* — Joseph E. Wrkich

(57) ABSTRACT

Methods and compositions are provided for improving metal dusting corrosion, abrasion resistance and/or erosion resistance for various materials, preferably for applications relating to high-temperature reactors, including dense fluidized bed reactor components. In particular, cermets comprising (a) at least one ceramic phase selected from the group consisting of metal carbides, metal nitrides, metal borides, metal oxides, metal carbonitrides, and mixtures of thereof and (b) at least one metal alloy binder phase are provided. Ceramic phase materials include chromium carbide ($Cr_{23}C_6$). Metal alloy binder phase materials include β-NiAl intermetallic alloys and $Ni_3Sn_2$ intermetallic alloys, as well as alloys that contain α-Cr and/or γ'-$Ni_3Al$ hard phases. Preferably, bimetallic materials are provided when the cer- (Continued)

met compositions are applied using a laser, e.g., a laser cladding method such as high power direct diode (HPDD) laser, or by plasma-based methods such as plasma transfer arc (PTA) welding and powder plasma welding (PPW).

14 Claims, 5 Drawing Sheets

(51) Int. Cl.
 *C22C 30/02* (2006.01)
 *B23K 101/34* (2006.01)
 *B23K 103/16* (2006.01)

(52) U.S. Cl.
 CPC .... *B23K 2101/35* (2018.08); *B23K 2103/166* (2018.08); *C22C 2204/00* (2013.01)

(56) References Cited

U.S. PATENT DOCUMENTS

| | | | |
|---|---|---|---|
| 2014/0272446 A1 | 9/2014 | Zheng et al. | 428/545 |
| 2016/0108501 A1 | 4/2016 | Jakobi et al. | C22C 30/00 |
| 2019/0032239 A1 | 1/2019 | Baba et al. | C25D 17/10 |

BIMETALLIC MATERIALS COMPRISING CERMETS WITH IMPROVED METAL DUSTING CORROSION AND ABRASION/EROSION RESISTANCE

CROSS REFERENCE TO RELATED APPLICATIONS

This application is a national stage filing of Patent Cooperation Treaty Application No. PCT/US2020/057992 filed Oct. 29, 2020, which claims the priority benefit of Provisional Application No. 62/929,202, filed Nov. 1, 2019, and European Patent Application No. 19218544.5 filed Dec. 20, 2019; the disclosures of 62/929,202 and 19218544.5 are incorporated herein by reference

FIELD OF INVENTION

Methods and compositions are provided for improving metal dusting corrosion, abrasion resistance and/or erosion resistance for various materials, preferably for applications relating to high-temperature reactors, such as dense fluidized bed (DFB) reactor components. In particular, bimetallic materials are provided, which comprise a cermet composition and a high temperature alloy substrate.

BACKGROUND OF INVENTION

Erosion resistant materials find use in many applications where surfaces are subject to eroding forces. For example, refinery process vessel walls and internals exposed to aggressive fluids containing hard, solid particles such as catalyst particles in various chemical and petroleum environments are subject to both erosion and corrosion. The protection of these vessels and internals against erosion and corrosion induced material degradation especially at high temperatures is a technological challenge. Refractory liners are used currently for components requiring protection against the most severe erosion and corrosion such as the inside walls of internal cyclones used to separate solid particles from fluid streams, for instance, the internal cyclones in fluid catalytic cracking units (FCCU) for separating catalyst particles from the process fluid. An example of erosion resistant materials is chemically-bonded castable alumina refractories. These castable alumina refractories are applied to the surfaces in need of protection and upon heat curing hardens and adheres to the surface via metal-anchors or metal-reinforcements. It also readily bonds to other refractory surfaces. The life span of the state-of-the-art refractory liners is significantly limited by excessive mechanical attrition of the liner from the high velocity solid particle impingement, mechanical cracking and spallation. Therefore there is a need for materials with superior erosion and corrosion resistance properties for high temperature applications.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

SUMMARY OF THE INVENTION

Figure 1:
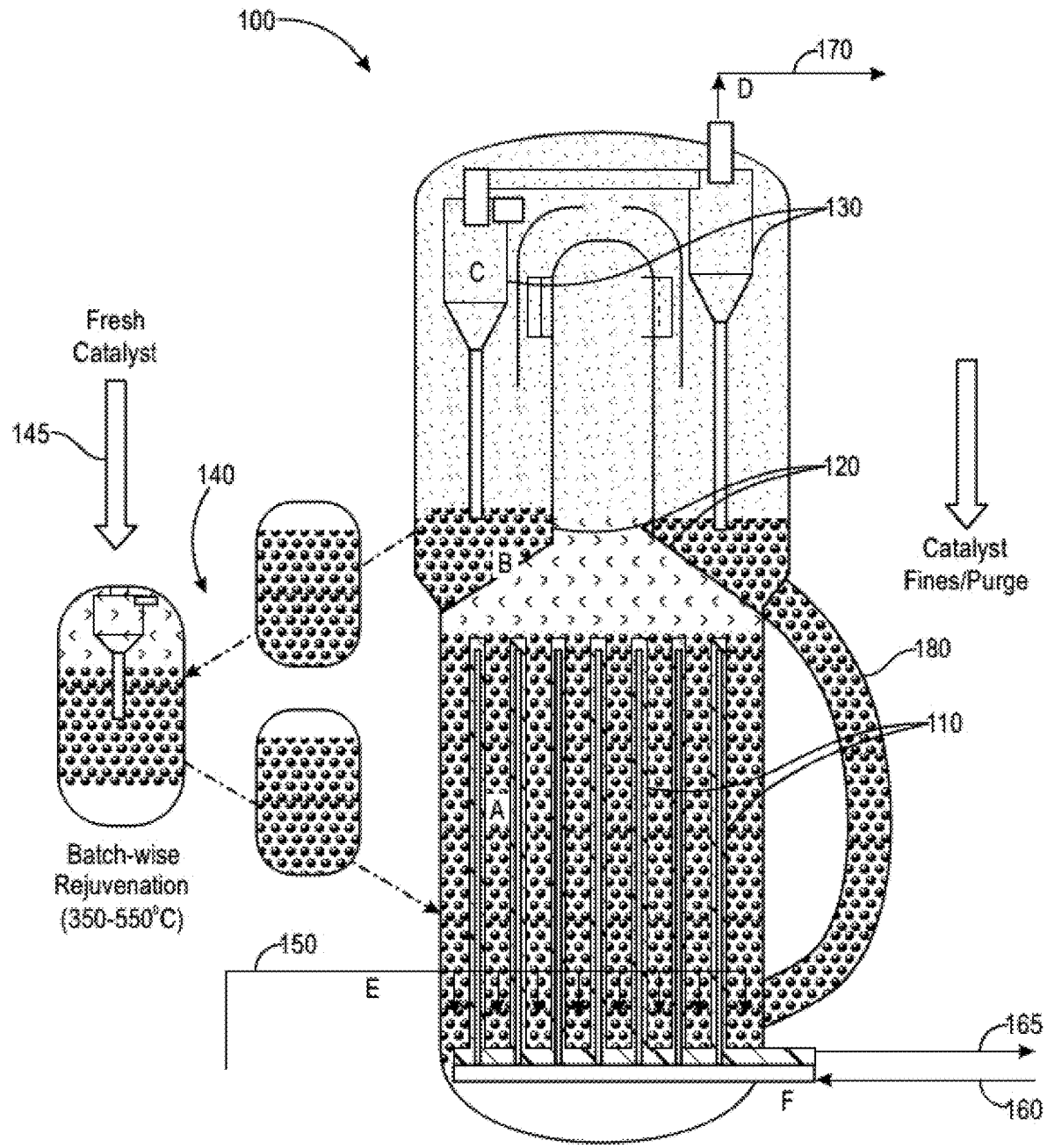
FIG. 1 is a schematic of a Dense Fluidized Bed (DFB) reactor.

Ceramic-metal composites are called cermets. Cermets of adequate chemical stability suitably designed for high hardness and fracture toughness can provide an order of magnitude higher erosion resistance over refractory materials known in the art. Cermets generally comprise a ceramic phase and a binder phase, and are commonly produced using powder metallurgy techniques where metal and ceramic powders are mixed, pressed and sintered at high temperatures to form dense compacts. The present application is broadly concerned with cermets, particularly cermet compositions comprising a novel alloy binder phase and/or a novel ceramic phase, as well as bimetallic materials thereof. Novel methods for making and using the cermet compositions and bimetallic materials thereof are also described herein. The cermets and bimetallic materials are suitable for high temperature or specialty applications wherein materials with superior erosion and corrosion resistance are required.

Methods and compositions relating to the cermet compositions and bimetallic materials are provided for improving metal dusting corrosion, abrasion resistance and/or erosion resistance for various materials, preferably for applications relating to high-temperature reactors. For example, dense fluidized bed (DFB) reactor components or inserts are described, which use the cermet compositions described in this application.

DETAILED DESCRIPTION

Improved cermet compositions and bimetallic materials thereof are provided, particularly those compositions suitable for use at high temperatures, as well as methods of making the cermets and bimetallic materials.

Furthermore, an improved method for protecting metal surfaces against erosion and corrosion under high temperature conditions is described herein, especially with respect to applications involving fluids and solids process applications requiring erosion resistance. Still more particularly, the compositions and methods herein relate to the use of erosion resistant cermet coatings, linings, and inserts that require superior erosion/corrosion resistance, and fracture toughness for use in oil and gas exploration and production, refining and petrochemical processing applications.

Certain preferred embodiments relate to cyclic C5 (CC5) processes that converts n-pentane to cyclic C5's, and the production of ultra-high purity dicyclopentadiene (DCPD).

DCPD can be further converted to polydicyclopentadiene (pDCPD) and cyclic olefin copolymer (COC). As described herein, the CC5 processes may enable high volume DCPD supply and lower cost for pDCPD derivatives, with substantial performance benefits. The cermet compositions described herein provide superior erosion and corrosion resistance properties in such applications.

Other preferred embodiments relate to alkane-dehydrogenation reactions (e.g., ethane to ethylene, propane to propylene, butane to butenes or butadiene, or iso-butane to isobutylene). Other reactions include aromatization reactions generally, preferably the conversion of naphthas to BTX (i.e., mixtures of benzene, toluene, and the three xylene isomers, ortho-xylene, meta-xylene and para-xylene). Also included are dehydro condensation aromatization reactions, such as those that convert $C_1$-$C_4$ to BTX mixtures.

The disclosed embodiments may be practiced with a variety of applications, where the cermets and bimetallic materials described will provide superior erosion and corrosion resistance. Examples of such applications include fluid bed reactors, as well as internal and external heat exchangers.

Also included with respect to each of these embodiments are various means of heat supply (e.g., steam, electric, flue gas, contained flame, molten metal or molten salt).

One of the preferred reactor options is a dense fluidized bed (DFB) reactor 100 shown in FIG. 1, which is somewhat similar to fluid catalytic cracking unit (FCCU) in refinery that contains cyclones, risers, and circulating catalysts. However, the DFB reactor in the CC5 process requires bayonet type heat exchanger tube bundles 110 to provide heat required to perform the endothermic CC5 reaction. The inner tube of the heater is exposed to superheated steam (820° C., 350 psi) flowing at about 15-30 m/sec. The outer tube of the bayonet heater is exposed to fluidized catalysts that are moving at about 2 m/sec in n-C5-containing feed gas and CC5 product gas streams. Hence, the outer tube surface is subjected to simultaneous abrasion and corrosion that could lead into tube wall thinning and pitting. Similarly, baffles 120 in the DFB reactor are also exposed to moving catalysts particles that would polish the baffle surfaces. When solid catalyst particles are rubbing and sliding on the substrate under low or moderate stresses, the resulting low impact effect could lead into micro-machining and polishing. Therefore, there is a need for step-out materials having superior abrasion and corrosion resistance properties.

In the DFB reactor 100, the product CC5 vapors are separated from the spent catalysts by flowing through a set of cyclones 130 within the reactor and the spent catalysts flow downward and are sent to the regenerator system 140. Since the CC5 process inevitably produces some carbonaceous material (coke) that deposits on the catalysts and very quickly reduces the catalyst reactivity. Hence, the spent catalysts are rejuvenated by burning off the deposited coke in the regenerator system 140 and reenter to the reactor along with fresh catalyst 145 that enters through regenerator system 140. The inside walls of internal cyclones 130 (cyclone liners) are exposed to aggressive gas streams containing hard catalyst particles and subjected to both erosion and corrosion. The life span of the conventional cyclone liners can be significantly limited by excessive mechanical attrition of the liner from the high-velocity (e.g., about >30 m/sec) solid particle impingement, mechanical cracking, and spalling. Hence, many DFB reactor 100 components could be subjected to metal dusting corrosion and abrasion/erosion.

Some examples of such DFB reactor 100 components include, but not limited to, the following: bayonet type heat exchanger tube bundles (heater), baffles, internal risers, feed nozzles, slide valves, and cyclone liners.

Under the CC5 process scheme, a feed gas mixture 150 (e.g. a mixture of nC5, $H_2$, $CH_4$ and other light hydrocarbons) is preheated at about 500° C. and enters into the DFB reactor. The feed gas converts under the presence of the dense catalyst bed and the introduction of heat from heat exchange device 110, supplied by steam feed 160. Heat exchange device 110 can take various forms, including but not limited to a bayonet style heat exchanger where steam feed 160 passes between the annulus of two concentric pipes. The steam feed 160, after transferring heat to the gas mixture contained within the DFB, exits reactor 100 at temperatures between 600 and 700° C. through line 165. The gas mixture, upon conversion within the DFB, undergoes cyclonic separation via separation device 130, where the catalyst is collected in region 120 prior to recirculation back into the DFB via transfer line 180. The product gas stream 170 exits the reactor at about 575° C. and 20 psi. The gas environment from feed preheat 150 through the product gas exit 170 can deteriorate any exposed metal in service by a very aggressive form of carbon-induced corrosion known as metal dusting.

Often aggressive nature of the hydrocarbon processing environments is described by thermodynamic carbon activities ($a_c$) and oxygen partial pressures ($P_{O2}$). Carbon activity of the CC5 process feed, (e.g., 20% n-C5, 20% $H_2$, 60% $CH_4$), is calculated by HSC Chemistry software and its value is about 1,200. In comparison, carbon activities of similar environments encountered in many syngas (a mixture of CO, $H_2$ and others) generation processes are in the range of about 2 to about 60. As used here, carbon activity ($a_c$) is a comparative number against solid carbon, which is $a_c=1$.

Moreover, the CC5 process feed does not allow any oxygen containing molecules (e.g., CO, $CO_2$, $H_2O$) and sulfur containing molecules (e.g., dimethyl sulfide, thiols, disulfides, polylsulfides), which are often used to control metal dusting corrosion in many syngas generation processes. For instance, small amount of sulfur containing molecules (e.g., about 10 ppm) is known to deactivate the Pt/Ag catalysts used in the CC5 process. Hence, metal dusting corrosion potential in the CC5 process is much higher.

Metal dusting is a deleterious form of high temperature carbon-induced corrosion experienced by Fe, Ni, and Co-based alloys at temperatures in the range of 400-800° C. in carbon-supersaturated environments ($a_c>1$) having relatively low ($P_{O2}$=about $10^{-10}$ to about $10^{-20}$) oxygen partial pressures. This form of corrosion is characterized by the disintegration of bulk metal into powder or dust comprising metals, oxides, carbides, and carbon. Most alloys that are commercially available today degrade by this corrosion process. However, in syngas related applications, nickel-based high chromium (e.g., about >30 wt. %) containing alloys are known to perform better than other alloys. Table 1 summarized such Ni-based, high Cr alloys known to be metal dusting resistant along with many other high temperature alloys that could be used as the DFB reactor components.

Erosion is a material removal process at the target surface by the action of streams and jets of solid particles or liquids. In most high temperature erosion environments, the eroding surface is undergoing corrosion as well as erosion. The erosion process is predominantly controlled by key impingement variables such as erodent velocity, impingement angle, erodent flux, and temperature. It is also affected by erodent particles variables (i.e., size, shape, hardness, toughness, and density) and by target material variables (i.e., hardness, toughness, and elastic modulus). Kinetic energy transfer from erodent particles to the target surface causes degradation. The erosion rate of a brittle material can be expressed by the following equation:

$$E \propto \frac{v_p^n \cdot D_p^m \cdot \rho_p^x}{K_{1C_t}^{1.3} \cdot H_t^y}$$

wherein $v_p$, Dp, and $\rho_p$ are the velocity, mean diameter, and density of impinging particles, respectively, and $K_{IC}$ and H are the toughness and hardness of the target material. During solid particle erosion at a hard, primarily elastic target, the impact force of the solid particles causes localized cracking, known as Hertzian cracks, at the surface along planes subject to maximum tensile stress. With continuing impacts, these cracks propagate, eventually link together, and detach as small fragments from the surface. This Hertzian cracking and subsequent crack growth under particle impact has been observed to be the primary erosion mechanism in brittle ceramic materials. Thus, resistance to micro-chipping and fracture requires high hardness (cohesive strength) and toughness of erosion resistant materials.

Abrasion occurs when solid particles are rubbing and sliding on the target substrate under low or moderate stresses. This low impact effect leads into micro-machining and polishing the target substrate surface. When solid abrasive particles are compressed between two substrate surfaces, it leads into high stress abrasion. When combination of abrasion with impact results in large chipping or scratching on the substrate surface, it is called gouging (severe abrasion). Similar to erosion resistance, resistance to abrasion and gouging requires high hardness and toughness of abrasion resistant materials.

The design approach described herein to erosion and abrasion resistant materials is to combine the benefits of erosion resistance offered by the ceramics with the fracture toughness attributes of the metallic alloys. Thus, ceramic-metal composites (cermets) as described herein have been developed to meet the erosion and abrasion resistant materials performance targets. A representation of a suitable cermet 200 is found in FIG. 2. The primary purpose of the ceramic phase 210 is to resist erosion and abrasion damage. This requires a high cohesive strength besides the chemical stability required for the high temperature hydrocarbon processing service in an aggressive metal dusting corrosion environment. The ceramic is dispersed in a continuous alloy binder phase 220, which forms another constituent of the cermet. The primary function of the alloy binder is to provide crack blunting and toughness. However, in this design, the alloy binder phase also provide the metal dusting corrosion resistance and thermal stability and long-term microstructure stability for the cermet as a whole. In any composite, the interface 230 plays a role in transferring load from the softer phase to the harder phase, and affects properties such as wettability, adhesion and strength. The cermet-substrate alloy interface 250 plays a role in properties such as adhesion, strength, inter-diffusion and long-term stability. The substrate alloy 240 plays a role in the metal dusting corrosion (MDC) resistance, steam oxidation resistance and mechanical strength. Thus, the ceramic-metal interface should have sufficient strength for this load transfer and provide blunting of cracks through plastic flow in the alloy via dislocation generation and migration, leading to significant reduction in the stress driving the crack propagation.

The ceramic phase of the cermets is exposed to metal dusting corrosion prone environments with high carbon activity and low oxygen partial pressure. Hence, metal carbide ($M_xC_y$) has been identified as a potential ceramic phase for the abrasion and erosion resistant materials. M is at least one element selected from a group consisting of Ti, Zr, Hf, V, Nb, Ta, Mo, W, Fe, Ni, Co, Cr, Al, Si, Mn, and mixtures of thereof, and x and y are whole or fractional numerical values with x ranging from 1 to 26 and y from 1 to 6.

Non-limiting examples of metal carbide ($M_xC_y$) include WC, TaC, HfC, $Mo_2C$, NbC, ZrC, TiC, VC, $Cr_3C_2$, $Cr_7C_6$, $Cr_{23}C_6$, and mixtures of thereof. These metal carbides have superior cohesive strength (hardness) rivalling or even far exceeding that of alumina, which is the base case of moving solid catalysts. Also, these metal carbides possess superior chemical stability in an environment having high carbon activity and low oxygen partial pressures.

The metal carbide ($M_xC_y$) phase constitutes about 5 vol. % to about 90 vol. % of the total volume of the cermet composition. Preferably the metal carbide ($M_xC_y$) phase constitutes about 10 vol. % to about 70 vol. % of the total volume of the cermet composition. The volume percent of cermet phase (and cermet components) excludes pore volume due to porosity.

The particle size of the metal carbide ($M_xC_y$) phase is typically below about 150 µm and more preferably below about 100 µm. The dispersed metal carbide ($M_xC_y$) particle can be any shape. Some non-limiting examples include spherical, ellipsoidal, polyhedral, distorted spherical, distorted ellipsoidal, and distorted polyhedral shapes. Particle size is meant the measure of longest axis of the 3-dimensional shaped particles. Microscopy methods such as optical microscopy (OM) and scanning electron microscopy (SEM) can be used to determine the particle size.

The alloy binder phase of the cermets provides metal dusting corrosion resistance, thermal stability, and long-term microstructure stability. The alloy binder phase comprises (PQR), wherein P is at least one base metal element selected from a group consisting of Ni, Co, Fe, and mixtures of thereof, Q is at least one alloying element selected from a group consisting of Cr, Al, Si, Mn, Cu, Ti, Zr, Hf, V, Nb, Ta, Mo, W, and mixtures of thereof, and R is at least one ceramic forming elements selected from a group consisting of C, N, B, O, and mixture of thereof. The alloy binder phase (PQR) of the present disclosure offers significant advantages relative to prior art alloy compositions for use as a cermet ingredient to provide abrasion and erosion resistance in metal dusting corrosion prone environments. The alloy binder phase (PQR) needs to be wettable on the metal carbide ($M_xC_y$) ceramic phase. Also, after the cermets are formed, the interface between the alloy binder phase (PQR) and the metal carbide ($M_xC_y$) ceramic phase needs to provide good adhesion and strength.

Figure 2:
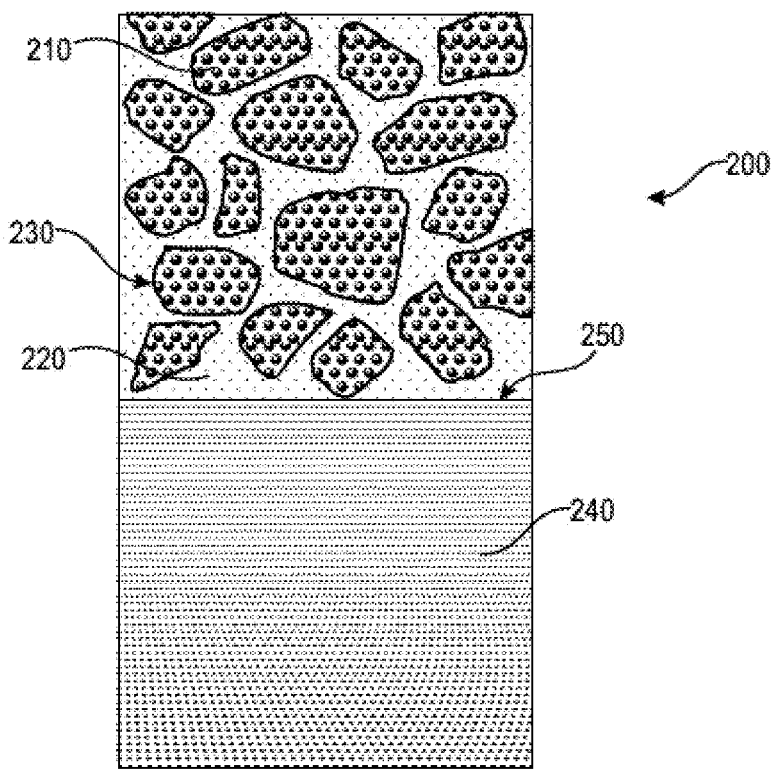
FIG. 2 is a schematic of a Bimetallic Material, showing the Ceramic Phase and the Alloy Binder Phase, as well the Cermet-Substrate Alloy Interface, and the Substrate Alloy.

The cermets consisting the metal carbide ($M_xC_y$) ceramic phase and the alloy binder phase (PQR) of the present disclosure can be applied on high temperature alloy substrates listed in Table 1 to form bimetallic materials with improved metal dusting corrosion and abrasion/corrosion resistance. In the bimetallic materials, the high temperature alloy substrates are preferably nickel-based high chromium (e.g., >about 30 wt. %) containing alloys and provide metal dusting corrosion resistance, steam oxidation resistance, and mechanical strength to ensure long-term use at high temperatures. Other high temperature alloys can be used as the substrate as long as the cermet layer of the present invention provides sufficient metal dusting corrosion resistance. Also, the interface between the cermet and the alloy substrate needs to provide good adhesion, strength, minimal inter-diffusion (dilution), and long-term stability. Key requirements of bimetallic materials comprising the cermet layer and the alloy substrate are schematically illustrated in FIG. 2.

The cermets of the bimetallic materials have a low porosity that contributes to their improved resistance to metal dusting corrosion and abrasion/corrosion. The cermets comprise less than about 3 vol. % porosity, more preferably less than about 1 vol. % porosity. Excessive porosity in the cermets serve as a pathway for corrosive hydrocarbon gases in metal dusting environments to transfer to the cermets to the alloy substrates. The carbon transfer triggers carbon precipitation in the cermets and delamination of the cermets at the alloy substrate interface. Thus, it is advantageous to achieve the cermets containing a minimal amount of porosity. The pores comprising the porosity is preferably not connected but distributed in the cermet body as discrete pores. The mean pore size is preferably the same or less than the mean particle size of the ceramic phase.

The cermets having a minimal amount of porosity can be established on the alloy substrates by a cladding method such as plasma transfer arc (PTA) welding, powder plasma welding, and laser cladding. The laser cladding method is a practical and robust fabrication option for the bimetallic materials of the present disclosure. The laser cladding method, in particular high power direct diode (HPDD) laser technology, is able to maintain its high power efficiency and quality, whilst dramatically reducing the cladding time and cost. It also provides lower dilution to the alloy substrates than PTA, weld overly, and $CO_2$ laser cladding. It is faster and offers up to 13 kg/hr deposition rate for WC containing alloys. It has unique broad beam, up to 36 mm wide, and does not oscillate to provide clad layer with a uniform thickness and sharp edges at a faster rate. Since its heat input is lower, it provides lower distortion of long tubes and large plates and less machining time.

The cermet compositions of the present disclosure can be achieved by adding ceramics, such as metal carbide ($M_xC_y$), into the alloy binder phase (PQR) and forming the cermet layer on the alloy substrates by a laser cladding method, or by directly laser cladding a new alloys of this invention on the alloy substrates that will lead into in-situ metal carbide ($M_xC_y$) formation. The resulting bimetallic materials provide the improved metal dusting corrosion and abrasion/erosion resistance.

In various aspects, bimetallic materials are provided for a new on-purpose cyclic C5 (CC5) process that converts n-pentane to cyclic C5's. One of the preferred reactor options is a dense fluidized bed (DFB) reactor, wherein bayonet type heat exchanger tube bundles (heater) are immersed in a moving solid catalyst bed to provide heat required to perform the endothermic CC5 reaction. Other reactor components such as baffles, internal risers, feed nozzles, slide valves, and cyclone linings are also exposed to moving catalysts in the CC5 process conditions.

Depending on velocity of moving catalysts, some of the reactor components are subjected to abrasion, erosion, or both. For example, the outer surface of the heater may be in contact with catalysts moving at about 2 m/sec. Under this condition, the reactor metal surface will get polished or micro-machined by moving catalyst particles, which are rubbing and sliding on the substrate (i.e., abrasion). The cyclone liners are exposed to fast moving catalyst particles (>about 30 m/sec), which results in continuous removal of the substrate (i.e., erosion). Also, all the reactor components are exposed to CC5 process gas streams which are very high carbon activity (about 1,200 vs<60 of conventional syngas) and low oxygen partial pressure environments. Hence, metal dusting corrosion is the primary mode of high temperature corrosion. Both metal dusting and abrasion/erosion issues are clear and present in a new CC5 process reactor.

In various aspects, bimetallic materials are provided that comprise the cermet compositions and the alloy substrates. The cermet compositions may be formed by adding ceramics (e.g., metal carbides) into the alloy binder phase and forming the cermet layer on the alloy substrates by a laser cladding method. The cermet compositions may also be formed by directly laser cladding a new alloy of this invention on the alloy substrates that will lead into in-situ metal carbide formation. The resulting bimetallic materials provide the improved metal dusting corrosion and abrasion/erosion resistance. Several different cases of bimetallic materials are described below.

A. Cermets by In-Situ Metal Carbide ($M_xC_y$) Formation from the Existing Alloy Phase (PQR)

Cermets can be formed by in-situ metal carbide ($M_xC_y$) formation from the existing alloy phase (PQR). Commercially available alloy compositions may be applied on commercially available alloy substrates by a laser cladding method to form the bimetallc materials of this invention. For example, dense fluidized bed (DFB) reactor components may comprise the cermet compositions (e.g., as an insert, coating or layer) for improved high-temperature applications.

An alloy phase (PQR) may be used, wherein P is at least one base metal element selected from a group consisting of Ni, Co, Fe, and mixtures of thereof, Q is at least one alloying element selected from a group consisting of Cr, Al, Si, Mn, Cu, Ti, Zr, Hf, V, Nb, Ta, Mo, W, and mixtures of thereof, and R is at least one ceramic forming elements selected from a group consisting of C, N, B, O, and mixture of thereof. In particular, an alloy phase (PQR) having proper amounts of alloying element Q and ceramic forming element R forms the cermets comprising sufficient metal carbides ($M_xC_y$), metal nitrides ($M_xN_y$), metal borides ($M_xB_y$), metal oxides ($M_xO_y$), and a mixture of thereof to increase hardness of the cermets at high temperatures. Hence, when the alloy phase (PQR) having proper amounts of alloying element Q and ceramic forming elements R is laser cladded on high temperature alloy substrates, it results in cermets by in-situ formation of metal carbides ($M_xC_y$), metal nitrides ($M_xN_y$), metal borides ($M_xB_y$), metal oxides ($M_xO_y$), and a mixture of thereof and the resulting bimetallic materials comprising the cermet layer and the alloy substrate provide the improved metal dusting corrosion and abrasion/erosion resistance.

One aspect relates to the existing commercially available alloy phase (PQR), wherein P is at least one base metal element selected from a group consisting of Ni, Co, Fe, and mixtures of thereof, Q is at least one alloying element selected from a group consisting of Cr, Al, Si, Mn, Cu, Ti, Zr, Hf, V, Nb, Ta, Mo, W, and mixtures of thereof, and R is at least one ceramic forming elements selected from a group consisting of C, N, B, O, and mixture of thereof. Examples of such alloy phase names and compositions are summarized in Table 2. When the alloy phase (PQR) listed in Table 2 is laser cladded on high temperature alloy substrates listed in Table 1, it results in the cermets by in-situ formation of metal carbides ($M_xC_y$), metal nitrides ($M_xN_y$), metal borides ($M_xB_y$), metal oxides ($M_xO_y$), and/or mixtures thereof.

TABLE 1

Various high temperature alloys

| | Alloy manufacturer and name | Nominal compositions (wt. %) |
|---|---|---|
| Ni-based, high Cr alloys (known to be metal dusting corrosion resistant in syngas environments) | Special Metals Inconel 693 | Bal. Ni:4Fe:28Cr:3.1Al:0.7Nb |
| | NSSMC alloy 696 | Bal. Ni:3Fe:30Cr:2Cu:2Mo:1.6Si |
| | Haynes HR235 | Bal. Ni:1Fe:31Cr:5.4Mo:3.5Cu:0.3Al |
| | VDM alloy 699XA | Bal. Ni:29Cr:2.0Al:0.5Fe |
| FeNi-based alloys | Inconel 825 | Bal. Fe:40Ni:22Cr:3.3Mo:1.9Cu:0.8Ti |
| | Haynes 224 | Bal. Fe:46Ni:21Cr:3.3Al:0.4Ti:0.4Mn |
| | Sandvik 353MA | Bal. Fe:35Ni:26Cr:1.6Si:1.3Mn:0.2N:RE |
| | Incoloy® 800HT | Bal. Fe:33Ni:21Cr:0.5Al:0.5Ti |
| | Incoloy® 803 | Bal. Fe:34Ni:26Cr:1Mn:1Si:0.5Al:0.6Ti |
| | HP40Nb | Bal. Fe:33Ni:26Cr:1.0Nb:1.5Si:1.3Min |
| FeNiCo-based alloy | Haynes 556 | Bal. Fe:19Ni:18Co:22Cr:2.8Mo:3.0W |
| NiCo-based alloys | Inconel 617 | Bal. Ni:13Co:21Cr:9.9Mo:1Al:1Fe:0.3T |
| | Inconel 740H | Bal. Ni:15Co:23.5Cr:0.5Nb:0.5Ti:0.2Al |
| | Haynes 160 | Bal. Ni:30Co:26Cr:2.6Si:0.6Mn |
| Ni-based alloys | Inconel 690 | Bal. Ni:4Fe:28Cr:3.1Al:0.7Nb |
| | Inconel 625 | Bal. Ni:5Fe:21Cr:8.8Mo:3.7Nb |
| | Inconel 602CA | Bal. Ni:10Fe:25Cr:2.3Al:0.6Mn |
| | Inconel 601 | Bal. Ni:13Fe:23Cr:1.3Al |
| | Inconel 600 | Bal. Ni:9Fe:16Cr:0.3Si:0.2Mn |
| | Haynes 214 | Bal. Ni:4Fe:17Cr:4.3Al:0.4Mn |
| | Haynes 230 | Bal. Ni:1Fe:22Cr:14W:1.3Mo:0.5Si |
| Steam Cracker Alloys | Kubota KHR45A | Bal. Fe:43Ni:31Cr:1.8Si:1.0Mn:0.5Nb:0.5C |
| | Kubota KHR35AF | Bal. Fe:33Ni:25Cr:3.0Al:0.5C |
| | Schmidt and Clemens HTE | Bal. Fe:45Ni:30Cr:4.0Al:0.5Nb:0.45C |
| | Manoir XAl4 | Bal. Fe:45Ni:25Cr:4.0Al:0.45C |
| Austenitic Stainless Steels | 304 | Bal. Fe:8Ni:18Cr |
| | 316 | Bal. Fe:12Ni:18Cr:2.5Mo |
| | 347 | Bal. Fe:10Ni:18Cr:1.0Nb |
| | 321 | Bal. Fe:10Ni:18Cr:0.7Ti |
| | 310 | Bal. Fe:20Ni:25Cr |

TABLE 2

Various alloy phase names and compositions

| | Nominal compositions (wt. %) |
|---|---|
| Mar-M-509® Co-based superalloy | Bal. Co:10Ni:23Cr:7W:3.5Ta:0.3Ti:0.5Zr:0.6C |
| Stellite™ alloy 1 | Bal. Co:30Cr:13W:2.5C:<2.0Ni:<1.0Mo:<2.0Fe:<2.0Si |
| Stellite™ alloy 6 | Bal. Co:28.5Cr:4.6W:1.2C:<2.0Ni:<1.0Mo:<2.0Fe:<2.0Si |
| Stellite™ alloy 12 | Bal. Co:30Cr:8.5W:1.45C:<2.0Ni:<1.0Mo:<2.0Fe:<2.0Si |
| Stellite™ alloy 20 | Bal. Co:32.5Cr:17.5W:2.55C:<2.0Ni:<1.0Mo:<2.0Fe:<1.0Si |
| Colmonoy® 84 (Ni-based alternative to Stellite™ 12) | Bal. Ni:29Cr:7.5W:2.0Fe:2.4Si:1.2C:1.4B |
| Critical flow nozzle alloy 1 | Bal. Fe:45Ni:35Cr:4.0W:2.0C |
| Critical flow nozzle alloy 2 | Bal. Fe:45Ni:35Cr:2.0Ti:2.0C |
| Critical flow nozzle alloy 3 | Bal. Fe:45Ni:35Cr:2.0Nb:2.0C |

When the alloy phase (PQR) listed in Table 2 is laser cladded on high temperature alloy substrates listed in Table 1, it results in the cermets by in-situ formation of metal carbides ($M_xC_y$), metal nitrides ($M_xN_y$), metal borides ($M_xB_y$), metal oxides ($M_xO_y$), and/or mixtures thereof. The resulting bimetallic materials comprising the cermet layer and the alloy substrate provide improved metal dusting corrosion and abrasion/erosion resistance. If the ceramic forming element R is carbon (C), metal carbides ($M_xC_y$) form as a ceramic phase of the cermets. For example, the metal M in metal carbides ($M_xC_y$) of the cermets is at least one element selected from the base metal element P consisting of Ni, Co, Fe, and mixtures of thereof and the alloy element Q consisting of Cr, Al, Si, Mn, Cu, Ti, Zr, Hf, V, Nb, Ta, Mo, W, and mixtures of thereof. The alloy phase (PQR) listed in Table 2 may contain another ceramic forming element R selected from a group consisting of nitrogen, boron, and oxygen. In this case, along with metal carbides ($M_xC_y$) that is formed from carbon, the cermets contain nitride, boride, oxide, carbonitride, and mixtures of thereof. Hence, the resulting cermets are comprised of various ceramic phases consisting of at least one selected from a group consisting metal carbides ($M_xC_y$), metal nitride ($M_xN_y$), metal boride ($M_xB_y$), metal oxide ($M_xO_y$), metal carbonitride ($M_xCN_y$), and mixtures of thereof.

Another aspect relates to the volume fraction of the ceramic phase in the cermet compositions that are formed from the alloy phase (PQR) after laser cladding on high temperature alloy substrates listed in Table 1. The ceramic phase of the cermets constitutes about 5 vol. % to 80 vol. % of the total volume of the cermet composition. Preferably the ceramic phase constitutes about 20 vol. % to 60 vol. % of the total volume of the cermet composition.

Thus, a dense fluidized bed (DFB) reactor component is provided, which comprises bimetallic materials comprising the cermets and the high temperature alloy substrates listed in Table 1. The bimetallic materials are formed by a laser cladding method. The cermets in the bimetallic materials are formed in-situ from an alloy phase (PQR), wherein P is at least one base metal element selected from a group consisting of Ni, Co, Fe, and mixtures of thereof, Q is at least one alloying element selected from a group consisting of Cr, Al, Si, Mn, Cu, Ti, Zr, Hf, V, Nb, Ta, Mo, W, and mixtures of thereof, and R is at least one ceramic forming elements selected from a group consisting of C, N, B, O, and mixture of thereof. The ceramic phase of the cermets in the laser cladded bimetallic materials constitutes about 20 vol. % to 60 vol. % of the total volume of the cermet composition.

B. New Alloy that Forms Cermets by In-Situ Metal Carbide ($M_xC_y$) Precipitation New alloys are described, which may form cermets by in-situ metal carbide ($M_xC_y$) precipitation. The new alloy compositions may be used to form cermets of bimetallic materials.

A new alloy composition is described, which comprises a) 28.0 to 33.0 wt. % chromium (Cr); b) 0.5 to 2.9 wt. % carbon (C); c) 4.1 to 30.0 wt. % alloying element selected from a group consisting of Fe, Co, Al, Si, Mn, Cu, Ti, Zr, Hf, V, Nb, Ta, Mo, W, and mixtures of thereof; d) balance nickel (Ni), the wt. % based on the total weight of the alloy. The new alloy composition of the present disclosure allows formation of cermets by in-situ metal carbide ($M_xC_y$) precipitation. Metal carbide ($M_xC_y$) is particularly useful as a ceramic phase of the cermets since the CC5 process conditions are characterized by very high carbon activity and lower oxygen partial pressure. Hence, metal carbide ($M_xC_y$) is stable in the CC5 process conditions. The new alloy composition can be laser cladded on high temperature alloy substrates listed in Table 1 to make the bimetallic materials that provide the improved metal dusting corrosion and abrasion/erosion resistance.

In discussing metal carbides, it is necessary to distinguish between primary and secondary types. Primary metal carbides form during the solidification process. They are inter-dendritic and form from the last liquid to freeze, which is generally enriched in alloying elements. These metal carbides are typically metastable and would dissolve if given sufficient time at elevated temperatures. Secondary metal carbides are those that precipitate as the result of thermal exposures during clad fabrication or during component service life. These metal carbides precipitate preferentially on grain boundaries and internal structural defects, such as twin boundaries and dislocations. The quality of secondary metal carbides that precipitate depends on the amount of carbon in solution, the exposure temperature, and the time at temperature. Therefore, conditions that generate a supersaturated solution of carbon followed by slow cooling or thermal arrests below carbide solvus temperatures will produce heavy secondary metal carbide precipitation.

The metal carbide types occurring in nickel-base alloys can be separated into two broad categories: those that are chromium-rich and those that are rich in refractory alloying elements. The chromium-rich carbides are of the forms $Cr_7C_3$ and $M_{23}C_6$. The $Cr_7C_3$ carbide forms only in a few simple alloys that are low in chromium as well as refractory alloying elements. It occurs as a blocky, inter-granular precipitate, and it is stable only at temperatures of the order of 1,050 to 1,150° C. It decomposes into $M_{23}C_6$ at lower temperatures. The $M_{23}C_6$ carbide can range in chemistry from $Cr_{23}C_6$ in simple nickel-chromium alloys to $Cr_{21}(Mo, W)_2C_6$ in alloys containing molybdenum and tungsten. Other elements, such as nickel, iron, and cobalt, can partially substitute for chromium. The $M_{23}C_6$ carbide can assume a variety of morphologies, such as discrete, globular particles, continuous grain boundary films, or a cellular grain boundary structure. Depending on alloy chemistry, $M_{23}C_6$ carbides can be stable to temperatures of 1,150° C. or above.

The common refractory metal carbides take on the forms of MC, $M_6C$, and $M_{12}C$. The MC carbides are formed by the reactive metal elements, such as titanium, zirconium, and hafnium, and by the refractory metal elements, such as vanadium, niobium, and tantalum. The MC carbides can contain mixtures of these elements, e.g., (Ti,Nb)C, as well as less refractory elements, such as molybdenum and tungsten, e.g., (Ti, Mo)C. If nitrogen is present in the alloy, carbonitride forms, such as Nb(C,N), are possible. The MC carbides are usually formed as primary carbides and present as discrete, angularly shaped particles within grains and at grain boundaries. The MC carbides are extremely stable and do not break down easily. Decomposition of MC carbide can yield the $M_{23}C_6$ or $M_6C$ carbide forms. The $M_6C$ carbides, also known as the eta ($\eta$) carbides, are usually formed between the refractory elements molybdenum and tungsten and the major matrix elements of nickel, iron, cobalt, and chromium. Carbide chemistries can vary widely from forms such as $(Ni,Co)_3Mo_3C$ to $(Ni,Co)_2W_4C$, and carbon contents may range above and below that required for stoichiometry. Silicon is also known to enter the carbide in large amounts. The $M_6C$ carbides can form both as primary and secondary precipitates in a globular morphology. The $M_{12}C$ carbides are closely related to the $M_6C$ carbides. They usually form between the refractory elements molybdenum and tungsten and the matrix elements nickel, iron, cobalt, and chromium. However, unlike $M_6C$, the $M_{12}C$ carbides exhibit preferentially in large quantities. The $M_{12}C$ carbide is usually observed as a secondary carbide after the dissolution or decomposition of primary $M_6C$ carbides.

The occurrence of intermetallic phases in nickel-base alloys carries both good and bad connotations. On the positive side, the nickel-base system has been the most widely and successfully exploited of any alloy base in the development of high-strength high-temperature alloys because of the occurrence of unique intermetallic phases such as gamma prime ($\gamma'$) and gamma double prime ($\gamma''$). On the negative side, the precipitation of certain intermetallic phases such as sigma ($\sigma$) phase, mu ($\mu$) phase, and Laves phase can seriously degrade ductility and corrosion resistance. However, such intermetallic phases are relatively hard, hence they can improve abrasion and erosion resistance.

A new alloy composition is described, which comprises a) 28.0 to 33.0 wt. % chromium (Cr); b) 0.5 to 2.9 wt. % carbon (C); c) 4.1 to 18.0 wt. % alloying element selected from a group consisting of Fe, Co, Al, Si, Mn, Cu, Ti, Zr, Hf, V, Nb, Ta, Mo, W, and mixtures of thereof; d) balance nickel (Ni), the wt. % based on the total weight of the alloy. The new alloy composition of the present disclosure allows formation of cermets by in-situ metal carbide ($M_xC_y$) precipitation. The new alloy composition can be laser cladded on high temperature alloy substrates listed in Table 1 to make the bimetallic materials that provide the improved metal dusting corrosion and abrasion/erosion resistance. Examples of such new alloy compositions that form cermets by in-situ metal carbide (MxCy) precipitation are summarized in Table 3.

TABLE 3

Various new alloy compositions

Nominal compositions (wt. %)

| | |
|---|---|
| EM1 | Bal. Ni:28Cr:7W:3.5Ta:0.3Ti:0.5Zr:0.6C |
| EM2 | Bal. Ni:30Cr:13W:2.5C |
| EM3 | Bal. Ni:28.5Cr:4.6W:1.2C |
| EM4 | Bal. Ni:30Cr:8.5W:1.45C |
| EM5 | Bal. Ni:30Cr:17.0W:1.0C |
| EM6 | Bal. Ni:32.5Cr:17.5W:2.55C |
| EM7 | Bal. Ni:32Cr:13.0W:2.5C |
| EM8 | Bal. Ni:29Cr:7.5W:2.4Si:1.2C |

Another aspect relates to the metal carbide ($M_xC_y$) ceramic phase volume fraction after the new alloy composition is laser cladded on high temperature alloy substrates listed in Table 1. The metal carbide ($M_xC_y$) ceramic phase of the cermets constitutes about 5 vol. % to 80 vol. % of the total volume of the cermet composition. Preferably the metal carbide ($M_xC_y$) ceramic phase constitutes about 20 vol. % to 60 vol. % of the total volume of the cermet composition.

Thus, bimetallic materials are described, which comprise the cermets and the high temperature alloy substrates listed in Table 1. The bimetallic materials are formed by a laser cladding method. The cermets in the bimetallic materials are formed in-situ from a new alloy comprising a) 28.0 to 33.0 wt. % chromium (Cr); b) 0.5 to 2.9 wt. % carbon (C); c) 4.1 to 18.0 wt. % alloying element selected from a group consisting of Fe, Co, Al, Si, Mn, Cu, Ti, Zr, Hf, V, Nb, Ta, Mo, W, and mixtures of thereof; d) balance nickel (Ni), the wt. % based on the total weight of the alloy. The ceramic phase of the cermets in the laser cladded bimetallic materials constitutes about 20 vol. % to 60 vol. % of the total volume of the cermet composition. The bimetallic material of the present disclose can be used as a dense fluidized bed (DFB) reactor component.

In addition, new alloys that form cermets by in-situ metal carbide precipitation may further contain metal boride ($M_xB_y$) precipitation. Metal boride ($M_xB_y$) is relatively hard, hence it can further improve abrasion and erosion resistance. The new alloy compositions that form cermets by both in-situ metal carbide ($M_xC_y$) precipitation and in-situ metal boride ($M_xB_y$) precipitation may be used to form cermets of bimetallic materials.

Hence, a new alloy composition is described, which comprises a) 28.0 to 33.0 wt. % chromium (Cr); b) 0.5 to 2.9 wt. % carbon (C); c) 0.1 to 1.5 wt. % boron (B); d) 4.1 to 30.0 wt. % alloying element selected from a group consisting of Fe, Co, Al, Si, Mn, Cu, Ti, Zr, Hf, V, Nb, Ta, Mo, W, and mixtures of thereof; e) balance nickel (Ni), the wt. % based on the total weight of the alloy. The new alloy composition can be laser cladded on high temperature alloy substrates listed in Table 1 to make the bimetallic materials that provide the improved metal dusting corrosion and abrasion/erosion resistance.

Examples of such new alloy compositions that form cermets by both in-situ metal carbide ($M_xC_y$) precipitation and metal boride ($M_xB_y$) precipitation are summarized in Table 4.

TABLE 4

Various new alloy compositions

Nominal compositions (wt. %)

| | |
|---|---|
| EM10 | Bal. Ni:30.0Cr:20.0W:1.5Nb:5.0Si:1.0C:1.0B |
| EM20 | Bal. Ni:30.0Cr:20.0W:1.5Nb:5.0Si:2.5C:1.0B |

TABLE 4-continued

Various new alloy compositions

Nominal compositions (wt. %)

| | |
|---|---|
| EM30 | Bal. Ni:33.0Cr:18.0Mo:2.0Si:1.5C:0.5B |
| EM40 | Bal. Ni:33.0Cr:18.0Mo:2.0Si:2.5C:1.5B |

Another aspect relates to the metal carbide ($M_xC_y$) and metal boride ($M_xB_y$) ceramic phase volume fraction after the new alloy composition is laser cladded on high temperature alloy substrates listed in Table 1. The combined metal carbide ($M_xC_y$) and metal boride ($M_xB_y$) ceramic phase of the cermets constitutes about 5 vol. % to 80 vol. % of the total volume of the cermet composition. Preferably the combined metal carbide ($M_xC_y$) and metal boride ($M_xB_y$) ceramic phase constitutes about 20 vol. % to 60 vol. % of the total volume of the cermet composition.

Thus, bimetallic materials are described, which comprise the cermets and the high temperature alloy substrates listed in Table 1. The bimetallic materials are formed by a laser cladding method. The cermets in the bimetallic materials are formed in-situ from a new alloy comprising a) 28.0 to 33.0 wt. % chromium (Cr); b) 0.5 to 2.9 wt. % carbon (C); c) 0.1 to 1.5 wt. % boron (B); d) 4.1 to 18.0 wt. % alloying element selected from a group consisting of Fe, Co, Al, Si, Mn, Cu, Ti, Zr, Hf, V, Nb, Ta, Mo, W, and mixtures of thereof; e) balance nickel (Ni), the wt. % based on the total weight of the alloy. The ceramic phase of the cermets in the laser cladded bimetallic materials constitutes about 20 vol. % to 60 vol. % of the total volume of the cermet composition. The bimetallic material of the present disclose can be used as a dense fluidized bed (DFB) reactor component.

C. Direct Dispersion of Metal Carbide ($M_xC_y$) into New Alloy Compositions to Form the Cermets Direct dispersion of metal carbides ($M_xC_y$) into new alloy compositions provide cermet compositions. The new alloy compositions permit direct addition of a ceramic phase, in order to form cermet compositions.

Cermets are described, which comprise a metal carbide ($M_xC_y$) ceramic phase, wherein M is at least one element selected from the group consisting of Ti, Zr, Hf, V, Nb, Ta, Mo, W, Fe, Ni, Co, Cr, Al, Si, Mn, and mixtures of thereof, and x and y are whole or fractional numerical values with x ranging from 1 to 26 and y from 1 to 6, and the new alloy composition comprising a) 28.0 to 46.0 wt. % chromium (Cr); b)<0.4 wt. % carbon (C); c) balance nickel (Ni), the wt. % based on the total weight of the alloy. Non-limiting examples of metal carbide ($M_xC_y$) include WC, TaC, HfC, $Mo_2C$, NbC, ZrC, TiC, VC, $Cr_3C_2$, $Cr_7C_6$, $Cr_{23}C_6$, and mixtures of thereof. These metal carbides have superior cohesive strength (hardness) and superior chemical stability in an environment having high carbon activity and low oxygen partial pressures. The metal carbide ($M_xC_y$) ceramic phase and the new alloy composition of this present invention can be mixed in an appropriate ratio and laser cladded on high temperature alloy substrates listed in Table 1 to make the bimetallic materials that provide the improved metal dusting corrosion and abrasion/erosion resistance.

The metal carbide ($M_xC_y$) phase constitutes about 10 vol. % to about 90 vol. % of the total volume of the cermet composition. Preferably the metal carbide ($M_xC_y$) phase constitutes about 20 vol. % to about 80 vol. % of the total volume of the cermet composition.

The particle size of the metal carbide ($M_xC_y$) phase is typically below about 150 μm and more preferably below about 100 µm. The dispersed metal carbide ($M_xC_y$) particle can be any shape. Some non-limiting examples include spherical, ellipsoidal, polyhedral, distorted spherical, distorted ellipsoidal, and distorted polyhedral shapes. Particle size is meant the measure of longest axis of the 3-dimensional shaped particles. Microscopy methods such as optical microscopy (OM) and scanning electron microscopy (SEM) can be used to determine the particle size.

In addition to the metal carbide ($M_xC_y$) phase, the intermetallic phases can be formed from the new alloy composition and metal M of the metal carbide ($M_xC_y$) phase which is at least one element selected from the group consisting of Ti, Zr, Hf, V, Nb, Ta, Mo, W, Fe, Ni, Co, Cr, Al, Si, Mn, and mixtures of thereof. In the present invention such intermetallic phases include sigma (σ) phase, mu (µ) phase, and Laves phase, which are relatively hard and improve abrasion and erosion resistance.

Thus, bimetallic materials are described, which comprise the cermets and the high temperature alloy substrates listed in Table 1. The bimetallic materials are formed by a laser cladding method. The cermets in the bimetallic materials comprise the metal carbide ($M_xC_y$) ceramic phase, wherein M is at least one element selected from the group consisting of Ti, Zr, Hf, V, Nb, Ta, Mo, W, Fe, Ni, Co, Cr, Al, Si, Mn, and mixtures of thereof, and x and y are whole or fractional numerical values with x ranging from 1 to 26 and y from 1 to 6, and the new alloy composition comprising a) 28.0 to 46.0 wt. % chromium (Cr); b)<0.4 wt. % carbon (C); c) balance nickel (Ni), the wt. % based on the total weight of the alloy. Non-limiting examples of metal carbide ($M_xC_y$) include WC, TaC, HfC, $Mo_2C$, NbC, ZrC, TiC, VC, $Cr_3C_2$, $Cr_7C_6$, $Cr_{23}C_6$, and mixtures of thereof. The metal carbide ($M_xC_y$) ceramic phase of the cermets in the laser cladded bimetallic materials constitutes about 20 vol. % to 80 vol. % of the total volume of the cermet composition. The bimetallic material of the present disclose can be used as a dense fluidized bed (DFB) reactor component.

D. Direct Dispersion of Stable Chromium Carbide ($Cr_{23}C_6$) into a New Alloy

Compositions and methods for direct dispersion of stable chromium carbide ($Cr_{23}C_6$) into the new alloy to form cermet compositions are provided. Preferably, a specific case of $Cr_{23}C_6$ and new alloy compositions thereof are used.

This invention described herein relates to the cermets consisting of chromium carbide ($Cr_{23}C_6$) ceramic phase and the new alloy composition comprising a) 28.0 to 50.0 wt. % chromium (Cr); b)<0.4 wt. % carbon (C); c) balance nickel (Ni), the wt. % based on the total weight of the alloy. This particular chromium carbide ($Cr_{23}C_6$) ceramic phase has superior cohesive strength (hardness) and chemical stability, and more importantly superior long-term microstructural stability in an environment having high carbon activity and low oxygen partial pressures. The chromium carbide ($Cr_{23}C_6$) ceramic phase and the new alloy composition of this present invention can be mixed in an appropriate ratio and laser cladded on high temperature alloy substrates listed in Table 1 to make the bimetallic materials that provide the improved metal dusting corrosion and abrasion/erosion resistance.

The chromium carbide ($Cr_{23}C_6$) ceramic phase constitutes about 10 vol. % to about 90 vol. % of the total volume of the cermet composition. Preferably the chromium carbide ($Cr_{23}C_6$) ceramic phase constitutes about 20 vol. % to about 80 vol. % of the total volume of the cermet composition.

The particle size of the chromium carbide ($Cr_{23}C_6$) ceramic phase is typically below about 150 µm and more preferably below about 100 µm. The dispersed chromium carbide ($Cr_{23}C_6$) particle can be any shape. Some non-limiting examples include spherical, ellipsoidal, polyhedral, distorted spherical, distorted ellipsoidal, and distorted polyhedral shapes. Particle size is meant the measure of longest axis of the 3-dimensional shaped particles. Microscopy methods such as optical microscopy (OM) and scanning electron microscopy (SEM) can be used to determine the particle size.

Thus, bimetallic material are described, which comprise the cermets and the high temperature alloy substrates listed in Table 1. The bimetallic materials are formed by a laser cladding method. The cermets in the bimetallic materials comprise a chromium carbide ($Cr_{23}C_6$) ceramic phase and the new alloy composition comprising a) 28.0 to 50.0 wt. % chromium (Cr); b)<0.4 wt. % carbon (C); c) balance nickel (Ni), the wt. % based on the total weight of the alloy. The chromium carbide ($Cr_{23}C_6$) ceramic phase of the cermets in the laser cladded bimetallic materials constitutes about 20 vol. % to 80 vol. % of the total volume of the cermet composition. The bimetallic material of the present disclose can be used as a dense fluidized bed (DFB) reactor component.

E. Direct Dispersion of Stable Carbides into a β-NiAl Intermetallic Alloy to Form the Cermets Compositions and methods for direct dispersion of stable carbides into a β-NiAl intermetallic alloy to form cermet compositions are described. Preferably, a specific β-NiAl intermetallic alloy composition may be used to make the cermet compositions. The β-NiAl has proven to be immune to metal dusting, and by incorporating stable carbides, it may form an improved cermet composition for the bimetallic materials.

This invention described herein relates to the cermets consisting of the metal carbide (MxCy) ceramic phase, and the intermetallic β-NiAl alloy composition comprising a) 17.1 to 39.0 wt. % aluminum (Al); b) 0.0 to 10.0 wt. % alloying element selected from a group consisting of Fe, Co, Cr, Si, Mn, Cu, Ti, Zr, Hf, V, Nb, Ta, Mo, W, and mixtures of thereof; c) balance nickel (Ni), the wt. % based on the total weight of the intermetallic β-NiAl alloy. M is at least one element selected from the group consisting of Ti, Zr, Hf, V, Nb, Ta, Mo, W, Fe, Ni, Co, Cr, Al, Si, Mn, and mixtures of thereof, and x and y are whole or fractional numerical values with x ranging from 1 to 26 and y from 1 to 6.

One non-limiting example of the intermetallic β-NiAl alloy is a composition free of alloying elements. Hence, the intermetallic β-NiAl alloy composition comprises of 17.1 to 39.0 wt. % aluminum (Al) and 61.0 to 82.9 wt. % nickel (Ni), the wt. % based on the total weight of the intermetallic β-NiAl alloy. Yet another non-limiting example of the intermetallic β-NiAl alloy is a composition comprising a) 17.1 to 39.0 wt. % aluminum (Al); b) 1.0 to 5.0 wt. % zirconium (Zr); c) balance nickel (Ni), the wt. % based on the total weight of the intermetallic β-NiAl alloy. The addition of Zr increases plasticity of the intermetallic β-NiAl alloy due to formation of Zr—Ni bonds. Yet another non-limiting example of the intermetallic β-NiAl alloy is a composition comprising a) 17.1 to 39.0 wt. % aluminum (Al); b) 0.5 to 5.0 wt. % zirconium (Zr) and 0.5 to 5.0 wt. % chromium (Cr); c) balance nickel (Ni), the wt. % based on the total weight of the intermetallic β-NiAl alloy. The addition of both Zr and Cr increases plasticity of the intermetallic β-NiAl alloy and improves corrosion resistance.

Non-limiting examples of metal carbide ($M_xC_y$) include WC, TaC, HfC, $Mo_2C$, NbC, ZrC, TiC, VC, $Cr_3C_2$, $Cr_7C_6$, $Cr_{23}C_6$, and mixtures of thereof. These metal carbides have superior cohesive strength (hardness) and superior chemical stability in an environment having high carbon activity and low oxygen partial pressures. The metal carbide ($M_xC_y$) ceramic phase and the intermetallic β-NiAl alloy phase of this present invention can be mixed in an appropriate ratio and laser cladded on high temperature alloy substrates listed in Table 1 to make the bimetallic materials that provide the improved metal dusting corrosion and abrasion/erosion resistance.

The metal carbide ($M_xC_y$) phase constitutes about 10 vol. % to about 70 vol. % of the total volume of the cermet composition. Preferably the metal carbide ($M_xC_y$) phase constitutes about 20 vol. % to about 60 vol. % of the total volume of the cermet composition.

The particle size of the metal carbide ($M_xC_y$) phase is typically below about 150 μm and more preferably below about 100 μm. The dispersed metal carbide ($M_xC_y$) particle can be any shape. Some non-limiting examples include spherical, ellipsoidal, polyhedral, distorted spherical, distorted ellipsoidal, and distorted polyhedral shapes. Particle size is meant the measure of longest axis of the 3-dimensional shaped particles. Microscopy methods such as optical microscopy (OM) and scanning electron microscopy (SEM) can be used to determine the particle size.

In addition to the metal carbide ($M_xC_y$) phase, the derivative intermetallic phases can be formed from the intermetallic β-NiAl alloy phase and metal M of the metal carbide ($M_xC_y$) phase which is at least one element selected from the group consisting of Ti, Zr, Hf, V, Nb, Ta, Mo, W, Fe, Ni, Co, Cr, Al, Si, Mn, and mixtures of thereof. In the present invention such intermetallic phases include sigma (σ) phase, mu (μ) phase, and Laves phase, which are relatively hard and improve abrasion and erosion resistance.

An intermetallic compound is defined as an ordered alloy phase formed between two metallic elements, where an alloy phase is ordered if two or more sublattices are required to describe its atomic structure. The ordered structure exhibits superior elevated temperature properties because of the long-range ordered superlattice, which reduces dislocation mobility and diffusion processes at elevated temperatures. The intermetallic β-NiAl alloy of this present invention is unique in that it has very high thermal conductivity combined with high strength at high temperature. These properties, combined with its high strength and low density and superior metal dusting corrosion resistance, make it ideal for applications in the CC5 process reactor components.

Thus, bimetallic materials are described, which comprise the cermets and the high temperature alloy substrates listed in Table 1. The bimetallic materials are formed by a laser cladding method. The cermets in the bimetallic materials comprise a metal carbide ($M_xC_y$) ceramic phase, wherein M is at least one element selected from the group consisting of Ti, Zr, Hf, V, Nb, Ta, Mo, W, Fe, Ni, Co, Cr, Al, Si, Mn, and mixtures of thereof, and x and y are whole or fractional numerical values with x ranging from 1 to 26 and y from 1 to 6, and the intermetallic β-NiAl alloy phase. The metal carbide ($M_xC_y$) ceramic phase of the cermets in the laser cladded bimetallic materials constitutes about 20 vol. % to 60 vol. % of the total volume of the cermet composition. The bimetallic material of the present disclose can be used as a dense fluidized bed (DFB) reactor component.

F. Direct Dispersion of Stable Carbides into $Ni_3Sn_2$ Intermetallic Alloy to Form Cermets Compositions and methods are provided for direct dispersion of stable carbides into $Ni_3Sn_2$ intermetallic alloy to form cermet compositions. Preferably, a $Ni_3Sn_2$ intermetallic alloy composition is used to make the cermets. $Ni_3Sn_2$ does not get metal dusted and more importantly it has excellent coking resistance. Hence, by incorporating stable carbides, it forms cermet compositions in the bimetallic materials, which provide improved metal dusting corrosion, as well as abrasion/erosion resistance.

This invention described herein relates to the cermets consisting of the metal carbide ($M_xC_y$) ceramic phase, wherein M is at least one element selected from the group consisting of Ti, Zr, Hf, V, Nb, Ta, Mo, W, Fe, Ni, Co, Cr, Al, Si, Mn, and mixtures of thereof, and x and y are whole or fractional numerical values with x ranging from 1 to 26 and y from 1 to 6, and the intermetallic $Ni_3Sn_2$ alloy composition comprising a) 54.8 to 59.9 wt. % tin (Sn); b) 0.0 to 10.0 wt. % alloying element selected from a group consisting of Fe, Co, Cr, Al, Si, Mn, Cu, Ti, Zr, Hf, V, Nb, Ta, Mo, W, and mixtures of thereof; c) balance nickel (Ni), the wt. % based on the total weight of the intermetallic $Ni_3Sn_2$ alloy.

One non-limiting example of the intermetallic $Ni_3Sn_2$ alloy is a composition free of alloying elements. Hence, the intermetallic $Ni_3Sn_2$ alloy composition comprises of 54.8 to 59.9 wt. % tin (Sn) and 40.1 to 45.2 wt. % nickel (Ni), the wt. % based on the total weight of the intermetallic $Ni_3Sn_2$ alloy. Yet another non-limiting example of the intermetallic $Ni_3Sn_2$ alloy is a composition comprising a) 54.8 to 59.9 wt. % tin (Sn); b) 1.0 to 5.0 wt. % copper (Cu); c) balance nickel (Ni), the wt. % based on the total weight of the intermetallic $Ni_3Sn_2$ alloy. The addition of Cu increases coking resistance of the intermetallic $Ni_3Sn_2$ alloy.

Non-limiting examples of metal carbide ($M_xC_y$) include WC, TaC, HfC, $Mo_2C$, NbC, ZrC, TiC, VC, $Cr_3C_2$, $Cr_7C_6$, $Cr_{23}C_6$, and mixtures of thereof. These metal carbides have superior cohesive strength (hardness) and superior chemical stability in an environment having high carbon activity and low oxygen partial pressures. The metal carbide ($M_xC_y$) ceramic phase and the intermetallic $Ni_3Sn_2$ alloy phase of this present invention can be mixed in an appropriate ratio and laser cladded on high temperature alloy substrates listed in Table 1 to make the bimetallic materials that provide the improved metal dusting corrosion and abrasion/erosion resistance.

The metal carbide ($M_xC_y$) phase constitutes about 10 vol. % to about 70 vol. % of the total volume of the cermet composition. Preferably the metal carbide ($M_xC_y$) phase constitutes about 20 vol. % to about 60 vol. % of the total volume of the cermet composition.

The particle size of the metal carbide ($M_xC_y$) phase is typically below about 150 μm and more preferably below about 100 μm. The dispersed metal carbide ($M_xC_y$) particle can be any shape. Some non-limiting examples include spherical, ellipsoidal, polyhedral, distorted spherical, distorted ellipsoidal, and distorted polyhedral shapes. Particle size is meant the measure of longest axis of the 3-dimensional shaped particles. Microscopy methods such as optical microscopy (OM) and scanning electron microscopy (SEM) can be used to determine the particle size.

In addition to the metal carbide ($M_xC_y$) phase, the derivative intermetallic phases can be formed from the intermetallic $Ni_3Sn_2$ alloy phase and metal M of the metal carbide ($M_xC_y$) phase which is at least one element selected from the group consisting of Ti, Zr, Hf, V, Nb, Ta, Mo, W, Fe, Ni, Co, Cr, Al, Si, Mn, and mixtures of thereof. In the present invention such intermetallic phases include sigma (σ) phase, mu (μ) phase, and Laves phase, which are relatively hard and improve abrasion and erosion resistance.

An intermetallic compound is defined as an ordered alloy phase formed between two metallic elements, where an alloy phase is ordered if two or more sublattices are required to describe its atomic structure. The ordered structure exhibits superior elevated temperature properties because of the long-range ordered superlattice, which reduces dislocation mobility and diffusion processes at elevated temperatures. The intermetallic $Ni_3Sn_2$ alloy of this present invention is unique in that it has relatively high melting point (1,264° C.) suitable for the elevated temperature application and superior metal dusting corrosion resistance, which makes it ideal for applications in the CC5 process reactor components.

Thus, bimetallic materials are described, which comprise the cermets and the high temperature alloy substrates listed in Table 1. The bimetallic materials are formed by a laser cladding method. The cermets in the bimetallic materials comprise a metal carbide ($M_xC_y$) ceramic phase, wherein M is at least one element selected from the group consisting of Ti, Zr, Hf, V, Nb, Ta, Mo, W, Fe, Ni, Co, Cr, Al, Si, Mn, and mixtures of thereof, and x and y are whole or fractional numerical values with x ranging from 1 to 26 and y from 1 to 6, and the intermetallic $Ni_3Sn_2$ alloy phase. The metal carbide ($M_xC_y$) ceramic phase of the cermets in the laser cladded bimetallic materials constitutes about 20 vol. % to 60 vol. % of the total volume of the cermet composition. The bimetallic material of the present disclose can be used as a dense fluidized bed (DFB) reactor component.

G. New Alloy that Contains Hard Phases (α-Cr and γ'-$Ni_3Al$) and Direct Dispersion of Metal Carbide ($M_xC_y$) into the New Alloy to Form Cermets New alloy compositions are described, which comprise a) 28.0 to 44.0 wt. % chromium (Cr); b) 3.5 to 17.0 wt. % aluminum (Al); c) 0.0 to 0.02 wt. % alloying element selected from a group consisting of Fe, Co, Si, Mn, Cu, Ti, Zr, Hf, V, Nb, Ta, Mo, W, C, B, P, and mixtures of thereof; and d) balance nickel (Ni), the wt. % based on the total weight of the new alloy composition. Hence, the new alloy composition is primarily based on three elements such as Ni, Cr, and Al. The Ni—Cr binary alloys containing higher amount of chromium show α-Cr lamellar structure in the α matrix by discontinuous precipitation (DP) reaction at grain boundaries. The level of Cr super-saturation in the α matrix affects kinetics of the DP reaction and determines spacing of the α-Cr lamellar phase. The addition of Al into the Ni—Cr binary alloys makes it ternary Ni—Cr—Al alloy, which is particularly beneficial since the added Al preferentially reacts with Ni in the alloy forms the γ'-$Ni_3Al$ phase. Therefore, Cr in the ternary alloy gets more supersaturated and promotes the DP reaction to form a lamellar structure with very narrow spacing. The resulting microstructure of such ternary alloy compositions consists of both α-Cr lamellar phase and γ'-$Ni_3Al$ cuboidal phase. These phases are hard and increase strength of the ternary Ni—Cr—Al alloy.

One non-limiting example of the new alloy that contains hard phases (α-Cr and γ'-$Ni_3Al$) is a composition free of alloying elements. Hence, the new alloy that contains hard phases (α-Cr and γ'-$Ni_3Al$) comprises of 28.0 to 41.0 wt. % chromium (Cr); b) 3.5 to 5.0 wt. % aluminum (Al); c) balance nickel (Ni), the wt. % based on the total weight of the new alloy composition. Yet another non-limiting example of the new alloy that contains hard phases (α-Cr and γ'-$Ni_3Al$) comprises of 28.0 to 34.0 wt. % chromium (Cr); b) 5.1 to 17.0 wt. % aluminum (Al); c) balance nickel (Ni), the wt. % based on the total weight of the new alloy composition.

One aspect of this invention relates to a new alloy composition comprising a) 28.0 to 44.0 wt. % chromium (Cr); b) 3.5 to 17.0 wt. % aluminum (Al); c) 0.0 to 0.02 wt. % alloying element selected from a group consisting of Fe, Co, Si, Mn, Cu, Ti, Zr, Hf, V, Nb, Ta, Mo, W, C, B, P, and mixtures of thereof; d) balance nickel (Ni), the wt. % based on the total weight of the new alloy composition. The new alloy composition of the present disclosure allows formation of hard phases such as α-Cr and γ'-$Ni_3Al$. The new alloy composition can be laser cladded on high temperature alloy substrates listed in Table 1 to make the bimetallic materials that provide the improved metal dusting corrosion and abrasion/erosion resistance. Examples of such new alloy compositions that form contains hard phases such as α-Cr and γ'-$Ni_3Al$ are summarized in Table 5.

TABLE 5

| Various new alloy compositions that forms hard phases | |
|---|---|
| | Nominal compositions (wt. %) |
| EM100 | Bal. Ni:38.0Cr:3.8Al |
| EM200 | Bal. Ni:40.0Cr:4.0Al |
| EM300 | Bal. Ni:30.0Cr:9.0Al |
| EM400 | Bal. Ni:32.0Cr:8.0Al |
| EM500 | Bal. Ni:34.0Cr:7.0Al |

Thus, bimetallic materials are described, which comprise the new alloy compositions that form hard phases, and the high temperature alloy substrates listed in Table 1. The bimetallic materials are formed by a laser cladding method. The new alloy compositions that form hard phases in the bimetallic materials comprise of a) 28.0 to 44.0 wt. % chromium (Cr); b) 3.5 to 17.0 wt. % aluminum (Al); c) 0.0 to 0.02 wt. % alloying element selected from a group consisting of Fe, Co, Si, Mn, Cu, Ti, Zr, Hf, V, Nb, Ta, Mo, W, C, B, P, and mixtures of thereof; d) balance nickel (Ni), the wt. % based on the total weight of the new alloy composition. The hard phases of the new alloy compositions comprise α-Cr and γ'-$Ni_3Al$ phases. The bimetallic material of the present disclose can be used as a dense fluidized bed (DFB) reactor component.

This invention described herein further relates to the cermets consisting of the metal carbide ($M_xC_y$) ceramic phase, wherein M is at least one element selected from the group consisting of Ti, Zr, Hf, V, Nb, Ta, Mo, W, Fe, Ni, Co, Cr, Al, Si, Mn, and mixtures of thereof, and x and y are whole or fractional numerical values with x ranging from 1 to 26 and y from 1 to 6, and a new alloy composition comprising a) 28.0 to 44.0 wt. % chromium (Cr); b) 3.5 to 17.0 wt. % aluminum (Al); c) 0.0 to 0.02 wt. % alloying element selected from a group consisting of Fe, Co, Si, Mn, Cu, Ti, Zr, Hf, V, Nb, Ta, Mo, W, C, B, P, and mixtures of thereof; d) balance nickel (Ni), the wt. % based on the total weight of the new alloy composition. Non-limiting examples of metal carbide ($M_xC_y$) include WC, TaC, HfC, $Mo_2C$, NbC, ZrC, TiC, VC, $Cr_3C_2$, $Cr_7C_6$, $Cr_{23}C_6$, and mixtures of thereof. These metal carbides have superior cohesive strength (hardness) and superior chemical stability in an environment having high carbon activity and low oxygen partial pressures. The metal carbide ($M_xC_y$) ceramic phase and the new alloy composition of this present invention can be mixed in an appropriate ratio and laser cladded on high temperature alloy substrates listed in Table 1 to make the bimetallic materials that provide the improved metal dusting corrosion and abrasion/erosion resistance.

One non-limiting example of the metal carbide ($M_xC_y$) ceramic phase is chromium carbide ($Cr_{23}C_6$) since it has superior cohesive strength (hardness) and chemical stability, and more importantly superior long-term microstructural stability in an environment having high carbon activity and low oxygen partial pressures. The chromium carbide ($Cr_{23}C_6$) ceramic phase and the new alloy composition of this present invention can be mixed in an appropriate ratio and laser cladded on high temperature alloy substrates listed in Table 1 to make the bimetallic materials that provide the improved metal dusting corrosion and abrasion/erosion resistance.

The metal carbide ($M_xC_y$) phase constitutes about 10 vol. % to about 90 vol. % of the total volume of the cermet composition. Preferably the metal carbide ($M_xC_y$) phase constitutes about 20 vol. % to about 80 vol. % of the total volume of the cermet composition.

The particle size of the metal carbide ($M_xC_y$) phase is typically below about 150 μm and more preferably below about 100 μm. The dispersed metal carbide ($M_xC_y$) particle can be any shape. Some non-limiting examples include spherical, ellipsoidal, polyhedral, distorted spherical, distorted ellipsoidal, and distorted polyhedral shapes. Particle size is meant the measure of longest axis of the 3-dimensional shaped particles. Microscopy methods such as optical microscopy (OM) and scanning electron microscopy (SEM) can be used to determine the particle size.

In addition to the metal carbide ($M_xC_y$) phase, the intermetallic phases can be formed from the new alloy composition and metal M of the metal carbide ($M_xC_y$) phase which is at least one element selected from the group consisting of Ti, Zr, Hf, V, Nb, Ta, Mo, W, Fe, Ni, Co, Cr, Al, Si, Mn, and mixtures of thereof. In the present invention such intermetallic phases include sigma (σ) phase, mu (μ) phase, and Laves phase, which are relatively hard and improve abrasion and erosion resistance.

Thus, bimetallic materials are described, which comprise the cermets and the high temperature alloy substrates listed in Table 1. The bimetallic materials are formed by a laser cladding method. The cermets in the bimetallic materials comprise a metal carbide ($M_xC_y$) ceramic phase, wherein M is at least one element selected from the group consisting of Ti, Zr, Hf, V, Nb, Ta, Mo, W, Fe, Ni, Co, Cr, Al, Si, Mn, and mixtures of thereof, and x and y are whole or fractional numerical values with x ranging from 1 to 26 and y from 1 to 6, and a new alloy composition comprising a) 28.0 to 44.0 wt. % chromium (Cr); b) 3.5 to 17.0 wt. % aluminum (Al); c) 0.0 to 0.02 wt. % alloying element selected from a group consisting of Fe, Co, Si, Mn, Cu, Ti, Zr, Hf, V, Nb, Ta, Mo, W, C, B, P, and mixtures of thereof; d) balance nickel (Ni), the wt. % based on the total weight of the new alloy composition. Non-limiting examples of metal carbide ($M_xC_y$) include WC, TaC, HfC, $Mo_2C$, NbC, ZrC, TiC, VC, $Cr_3C_2$, $Cr_7C_6$, $Cr_{23}C_6$, and mixtures of thereof. The metal carbide ($M_xC_y$) ceramic phase of the cermets in the laser cladded bimetallic materials constitutes about 20 vol. % to 80 vol. % of the total volume of the cermet composition. The bimetallic material of the present disclose can be used as a dense fluidized bed (DFB) reactor component.

All numbers and ranges disclosed above may vary by some amount. Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values.

As used herein, "wt. %" means percentage by weight, "vol. %" means percentage by volume, and "mol. %" means percentage by mole. All nominal compositions are provided as wt. %, unless otherwise noted, with the term "Bal." indicating that the balance comprises the specified element.

All ranges expressed herein should include both end points as two specific embodiments unless specified or indicated to the contrary.

The volume percent of each phase, component and the pore volume (or porosity) can be determined from the 2-dimensional area fractions by the Scanning Electron Microscopy method. For example, Scanning Electron Microscopy (SEM) may be conducted on the sintered cermet samples to obtain a secondary electron image preferably at 1000× magnification. For the area scanned by SEM, X-ray dot image was obtained using Energy Dispersive X-ray Spectroscopy (EDXS). The SEM and EDXS analyses were conducted on five adjacent areas of the sample. The 2-dimensional area fractions of each phase was then determined using the image analysis software: EDX Imaging/Mapping Version 3.2 (EDAX Inc, Mahwah, N.J. 07430, USA) for each area. The arithmetic average of the area fraction was determined from the five measurements. The volume percent (vol. %) is then determined by multiplying the average area fraction by 100. The vol. % expressed in the examples have an accuracy of +/−50% for phase amounts measured to be less than 2 vol. % and have an accuracy of +/−20% for phase amounts measured to be 2 vol. % or greater.

Determination of weight percent may be conducted using any suitable method. For example, the weight percent of elements in the cermet phases may be determined by standard methods known to a person skilled in the art, including but not limited to inductively coupled plasma (ICP) and atomic absorption (AA) mass spectroscopy, auger electron spectroscopy (AES), and EDXS analysis.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

Preferably, the cermet compositions described above may be formed in-situ from the metal alloy binder phase by a laser cladding method. Alternatively, plasma-based methods such as plasma transfer arc (PTA) welding and powder plasma welding (PPW) could be used. In certain aspects, the laser cladding method is high power direct diode (HPDD) laser. The cermet composition may be formed in-situ or by precipitation techniques, as well as by combining an efficient amount of the ceramic phase and an effective amount of the metal alloy binder phase to form a mixture, and then applying the mixture to the substrate using a laser technique. A stream of a desired powder is fed into a focused laser beam as it is scanned across the target alloy surface, leaving behind a deposited coating of the chosen cermet material. The desire powder could be a metallic powder that is capable of forming in-situ cermets, or a mixture of a ceramic powder and the metal alloy binder powder, or two separate streams of a ceramic powder and the metal alloy binder powder. Hence, laser cladding is a weld overlay processing method for adding one material to the surface of another in a controlled manner. It enables the applied material to be deposited selectively, accurately, and with minimal heat input just where it is required. The deposits are fully fused to the substrate with little or no porosity. Minimal heat input results in narrow heat affected zone (HAZ). Thus, it leads into limited distortion of the substrate and reduces the need for additional corrective machining. It is easy to automate and integrate into CAD/CAM and CMC production environments.

One feature of the cermet compositions described herein is their microstructural stability, even at elevated temperatures, making them particularly suitable for use in protecting metal surfaces against erosion at temperatures in the range of about 300° C. to about 650° C. It is believed this stability will permit their use for time periods greater than 2 years, for example is for about 2 years to about 10 years. In contrast many known cermets undergo transformations at elevated temperatures which results in the formation of phases which have a deleterious effect on the properties of the cermet.

The high temperature stability of the cermets described herein make them suitable for applications where refractories are currently employed. A non-limiting list of suitable uses include liners for process vessels, transfer lines, cyclones, for example, fluid-solids separation cyclones as in the cyclone of Fluid Catalytic Cracking Unit used in refining industry, grid inserts, thermo wells, valve bodies, slide valve gates and guides, catalyst regenerators, and the like. Thus, metal surfaces exposed to erosive or corrosive environments, especially at about 300° C. to about 650° C. are protected by providing the surface with a layer of the cermet compositions described herein.

Embodiments disclosed herein may include Embodiments A-G, and combinations thereof.

Embodiment A relates to a dense fluidized bed (DFB) reactor component comprising a cermet composition, where the dense fluidized bed (DFB) reactor component comprises a high temperature alloy substrate selected from the group consisting of (i) Ni-based, high Cr alloys, (ii) FeNi-based alloys, (iii) FeNiCo-based alloys, (iv) NiCo-based alloys, (v) Ni-based alloys, (vi) Steam Cracker Alloys, (vii) Austenitic Stainless Steels and mixtures thereof, and where the cermet composition comprises (a) at least one ceramic phase (e.g., selected from the group consisting of metal carbides ($M_xC_y$), metal nitrides ($M_xN_y$), metal borides ($M_xB_y$), metal oxides ($M_xO_y$), metal carbonitrides ($M_xCN_y$), and mixtures of thereof) and (b) at least one metal alloy binder phase of formula PQR.

M is at least one element selected from a group consisting of titanium (Ti), Zirconium (Zr), Hafnium (Hf), Vanadium (V), Niobium (Nb), Tantalum (Ta), Molybdenum (Mo), Tungsten (W), Iron (Fe), Nickel (Ni), Cobalt (Co), Chromium (Cr), Aluminium (Al), Silicon (Si), Manganese (Mn), and mixtures of thereof; x is a whole or fractional numerical value ranging from 1 to 26; and y is a whole or fractional numerical value ranging from 1 to 6. In certain preferred embodiments, M is selected from the group consisting of Tungsten (W), Molybdenum (Mo), Titanium (Ti), Chromium (Cr), and mixtures of thereof.

P is at least one base metal element selected from a group consisting of Iron (Fe), Nickel (Ni), Cobalt (Co), and mixtures of thereof.

Q is at least one alloying element selected from a group consisting of Chromium (Cr), Aluminium (Al), Silicon (Si), Manganese (Mn), Copper (Cu), titanium (Ti), Zirconium (Zr), Hafnium (Hf), Vanadium (V), Niobium (Nb), Tantalum (Ta), Molybdenum (Mo), Tungsten (W), and mixtures of thereof.

R is at least one ceramic forming element selected from a group consisting of carbon (C), nitrogen (N), boron (B), oxygen (O), and mixture of thereof. For example, R may be a combination of carbon, and a second element selected from a group consisting of nitrogen (N), boron (B), and oxygen (O). In certain embodiments, R is carbon (C) and the at least one ceramic phase comprises a metal carbide of formula $M_xC_y$.

In certain embodiments, the cermet composition may comprise a metal carbide and a second ceramic phase material selected from the group consisting of metal nitride ($M_xN_y$), metal boride ($M_xB_y$), metal oxide ($M_xO_y$), and metal carbonitride.

The cermet composition may be formed in-situ from the metal alloy binder phase by a laser cladding method, or plasma-based methods, including transfer arc (PTA) welding and powder plasma welding (PPW) methods. In certain aspects, the laser cladding method is high power direct diode (HPDD) laser.

In certain aspects, the dense fluidized bed (DFB) reactor component has a metal dusting corrosion rate of less than about 5 mils per year (mpy). Preferably, the dense fluidized bed (DFB) reactor component has an abrasion/erosion resistance value of at least about 5 times better than the abrasion/erosion resistance value of the substrate, more preferably, an abrasion/erosion resistance value of at least about 7 times better than the abrasion/erosion resistance value of the substrate.

Embodiment B relates to a metal alloy composition comprising: (i) about 28.0 to about 33.0 wt. % chromium (Cr); (ii) about 0.5 to about 2.9 wt. % carbon (C); (iii) about 4.1 to about 30.0 wt. % of an alloying element selected from the group consisting of Iron (Fe), Cobalt (Co), Aluminium (Al), Silicon (Si), Manganese (Mn), Copper (Cu), Titanium (Ti), Zirconium (Zr), Hafnium (Hf), Vanadium (V), Niobium (Nb), Tantalum (Ta), Molybdenum (Mo), Tungsten (W), and mixtures of thereof; and (iv) the balance being nickel (Ni), wherein the wt. % is based on the total weight of the metal alloy composition. In certain aspects, the metal alloy compositions, comprise about 4.1 to about 18.0 wt. % of the alloying element.

In certain aspects, the metal alloy binder phase has a nominal composition (wt. %) of:

Bal.Ni:28Cr:7W:3.5Ta:0.3Ti:0.5Zr:0.6C
Bal.Ni:30Cr:13W:2.5C
Bal.Ni:28.5Cr:4.6W:1.2C
Bal.Ni:30Cr:8.5W:1.45C
Bal.Ni:30Cr:17.0W:1.0C
Bal.Ni:32.5Cr:17.5W:2.55C
Bal.Ni:32Cr:13.0W:2.5C; or
Bal.Ni:29Cr:7.5W:2.4Si:1.2C.

Furthermore, bimetallic materials are provided, which comprise (i) a high temperature alloy substrate, and (ii) the cermet composition are included, wherein the high temperature alloy substrate comprises a high temperature alloy substrate selected from the group consisting of (i) Ni-based, high Cr alloys, (ii) FeNi-based alloys, (iii) FeNiCo-based alloys, (iv) NiCo-based alloys, (v) Ni-based alloys, (vi) Steam Cracker Alloys, (vii) Austenitic Stainless Steels and mixtures thereof; and wherein the cermet composition comprises: (a) at least one ceramic phase material selected from the group consisting of metal carbides ($M_xC_y$), metal nitrides ($M_xN_y$), metal borides ($M_xB_y$), metal oxides ($M_xO_y$), metal carbonitrides ($M_xCN_y$), and mixtures of thereof; and (b) the at least one metal alloy binder phase comprising (i) about 28.0 to about 33.0 wt. % chromium (Cr); (ii) about 0.5 to about 2.9 wt. % carbon (C); (iii) about 4.1 to about 30.0 wt. % of an alloying element selected from the group consisting of Iron (Fe), Cobalt (Co), Aluminium (Al), Silicon (Si), Manganese (Mn), Copper (Cu), Titanium (Ti), Zirconium (Zr), Hafnium (Hf), Vanadium (V), Niobium (Nb), Tantalum (Ta), Molybdenum (Mo), Tungsten (W), and mixtures of thereof; and (iv) the balance being nickel (Ni), wherein the wt. % is based on the total weight of the alloy; and wherein the cermet composition is formed in-situ from the metal alloy binder phase by precipitation of the ceramic phase material.

M is at least one element selected from a group consisting of titanium (Ti), Zirconium (Zr), Hafnium (Hf), Vanadium (V), Niobium (Nb), Tantalum (Ta), Molybdenum (Mo), Tungsten (W), Iron (Fe), Nickel (Ni), Cobalt (Co), Chromium (Cr), Aluminium (Al), Silicon (Si), Manganese (Mn), and mixtures of thereof, x is a whole or fractional numerical value ranging from 1 to 26; and y is a whole or fractional numerical value ranging from 1 to 6.

In certain aspects, the bimetallic material comprises at least one metal alloy binder phase that comprises from about 4.1 to about 18.0 wt. % of the alloying element.

In certain aspects, the bimetallic materials comprises a metal carbide ($M_xC_y$).

The ceramic phase of the cermet composition in the bimetallic materials may preferably constitute about 5 vol. % to about 80 vol. % of the total volume of the cermet composition, or preferably about 20 vol. % to about 60 vol. % of the total volume of the cermet composition.

In certain aspects, the bimetallic materials may be used as a coating, layer or insert for a dense fluidized bed (DFB) reactor component.

In certain aspects, the bimetallic materials comprise a metal carbide ($M_xC_y$), preferably the metal carbide ($M_xC_y$) comprises MC, $M_6C$, $M_{12}C$, $M_{23}C_6$, $Cr_7C_3$, $Cr_{21}Mo_2C6$, $C_{21}W_2C_6$, and mixtures thereof. In certain aspects, M is selected from the group consisting of Tungsten (W), Molybdenum (Mo), Titanium (Ti), Chromium (Cr), and mixtures of thereof.

In certain aspects, bimetallic materials are provided, wherein the ceramic phase material constitutes about 5 vol. % to about 80 vol. % of the total volume of the cermet composition, preferably the ceramic phase material constitutes about 20 vol. % to about 60 vol. % of the total volume of the cermet composition.

In certain aspects, the at least one metal alloy binder phase has a nominal composition (wt. %) selected from the group consisting of:
Bal.Ni:28Cr:7W:3.5Ta:0.3Ti:0.5Zr:0.6C
Bal.Ni:30Cr:13W:2.5C
Bal.Ni:28.5Cr:4.6W:1.2C
Bal.Ni:30Cr:8.5W:1.45C
Bal.Ni:30Cr:17.0W:1.0C
Bal.Ni:32.5Cr:17.5W:2.55C
Bal.Ni:32Cr:13.0W:2.5C; and
Bal.Ni:29Cr:7.5W:2.4Si:1.2C.

In certain aspects, the metal alloy composition further comprises about 0.1 to 1.5 wt. % boron base on the total weight of the metal alloy composition. The metal alloy binder phase may have a nominal composition (wt. %) of:
Bal.Ni:30.0Cr:20.0W:1.5Nb:5.0Si:1.0C:1.0B
Bal.Ni:30.0Cr:20.0W:1.5Nb:5.0Si:2.5C:1.0B
Bal.Ni:33.0Cr:18.0Mo:2.0Si:1.5C:0.5B or
Bal.Ni:33.0Cr:18.0Mo:2.0Si:2.5C:1.5B.

Certain aspects relate to methods for making the bimetallic materials described above, which comprises laser cladding the metal alloy binder phase onto the high temperature alloy substrate. Preferably, the laser cladding method is selected from the group consisting of plasma transfer arc (PTA) welding, powder plasma welding, and/or high power direct diode (HPDD) laser.

Certain aspects relate to methods for improving the metal dusting corrosion, abrasion resistance and/or erosion resistance by laser cladding a cermet composition onto a high temperature alloy substrate, comprising: providing a high temperature alloy substrate selected from the group consisting of (i) Ni-based, high Cr alloys, (ii) FeNi-based alloys, (iii) FeNiCo-based alloys, (iv) NiCo-based alloys, (v) Ni-based alloys, (vi) Steam Cracker Alloys, (vii) Austenitic Stainless Steels and mixtures thereof; and (2) providing a cermet composition, which comprises a metal alloy binder phase, and a ceramic phase material, wherein the metal alloy binder phase comprises: (i) about 28.0 to about 33.0 wt. % chromium (Cr); (ii) about 0.5 to about 2.9 wt. % carbon (C); (iii) about 4.1 to about 30.0 wt. % of an alloying element selected from the group consisting of Iron (Fe), Cobalt (Co), Aluminium (Al), Silicon (Si), Manganese (Mn), Copper (Cu), Titanium (Ti), Zirconium (Zr), Hafnium (Hf), Vanadium (V), Niobium (Nb), Tantalum (Ta), Molybdenum (Mo), Tungsten (W), and mixtures of thereof; and (iv) the balance being nickel (Ni), wherein the wt. % is based on the total weight of the alloy. The cermet composition is formed in-situ from the metal alloy binder phase by precipitation of the at least one ceramic phase material selected from the group consisting of metal carbides ($M_xC_y$), metal nitrides ($M_xN_y$), metal borides ($M_xB_y$), metal oxides ($M_xO_y$), metal carbonitrides ($M_xCN_y$), and mixtures of thereof.

In various aspects, the methods comprise laser cladding the cermet composition onto the high temperature alloy substrate. For example, the laser cladding method is selected from the group consisting of plasma transfer arc (PTA) welding, powder plasma welding, and/or high power direct diode (HPDD) laser.

In certain aspects, a dense fluidized bed (DFB) reactor component, comprises the bimetallic material, wherein the DFB has a metal dusting corrosion rate less than 5 mils per year (mpy). In other aspects, the dense fluidized bed (DFB) reactor component, comprises the bimetallic material, wherein the DFB has an abrasion/erosion resistance value of at least about 5 times better than the abrasion/erosion resistance value of the substrate, preferably, an abrasion/erosion resistance value of at least about 7 times better than the abrasion/erosion resistance value of the substrate.

Embodiment C relates to a metal alloy composition comprising (i) about 28.0 to about 35.0 wt. % chromium (Cr); (ii) about 0.5 to about 2.9 wt. % carbon (C); (iii) about 4.1 to about 30.0 wt. % of an alloying element selected from the group consisting of Iron (Fe), Cobalt (Co), Aluminium (Al), Silicon (Si), Manganese (Mn), Copper (Cu), Titanium (Ti), Zirconium (Zr), Hafnium (Hf), Vanadium (V), Niobium (Nb), Tantalum (Ta), Molybdenum (Mo), Tungsten (W), and mixtures of thereof; and (iv) the balance being nickel (Ni), wherein the wt. % is based on the total weight of the alloy. Preferably, the metal alloy composition comprises 4.1 to 18.0. wt % of the alloying element.

Bimetallic materials are also provided, which comprise (i) the high temperature alloy substrate, and (ii) a cermet composition. The high temperature alloy substrate comprises a high temperature alloy substrate selected from the group consisting of (i) Ni-based, high Cr alloys, (ii) FeNi-based alloys, (iii) FeNiCo-based alloys, (iv) NiCo-based alloys, (v) Ni-based alloys, (vi) Steam Cracker Alloys, (vii) Austenitic Stainless Steels, and mixtures thereof. The cermet composition comprises (a) at least one ceramic phase material selected from the group consisting of metal carbides ($M_xC_y$), metal nitrides ($M_xN_y$), metal borides ($M_xB_y$), metal oxides ($M_xO_y$), metal carbonitrides ($M_xCN_y$), and mixtures of thereof, and (b) at least one metal alloy binder phase. The at least one metal alloy binder phase comprising (i) about 28.0 to about 35.0 wt. % chromium (Cr); (ii) about 0.5 to about 2.9 wt. % carbon (C); (iii) about 4.1 to about 30.0 wt. % of an alloying element selected from the group consisting of Iron (Fe), Cobalt (Co), Aluminium (Al), Silicon (Si), Manganese (Mn), Copper (Cu), Titanium (Ti), Zirconium (Zr), Hafnium (Hf), Vanadium (V), Niobium (Nb), Tantalum (Ta), Molybdenum (Mo), Tungsten (W), and mixtures of thereof; and (iv) the balance being nickel (Ni), wherein the wt. % is based on the total weight of the alloy. The bimetallic material is formed by combining an effective amount of the at least one ceramic phase material and an effective amount of the at least one metal alloy binder phase to form a mixture, and applying the mixture to the high temperature alloy substrate by a laser cladding method. M is at least one element selected from a group consisting of titanium (Ti), Zirconium (Zr), Hafnium (Hf), Vanadium (V), Niobium (Nb), Tantalum (Ta), Molybdenum (Mo), Tungsten (W), Iron (Fe), Nickel (Ni), Cobalt (Co), Chromium (Cr), Aluminium (Al), Silicon (Si), Manganese (Mn), and mixtures of thereof, x is a whole or fractional numerical value ranging from 1 to 26; and y is a whole or fractional numerical value ranging from 1 to 6.

In certain aspects, the bimetallic materials are prepared using a laser cladding method, preferably selected from the group consisting of plasma transfer arc (PTA) welding, powder plasma welding and high power direct diode (HPDD) laser.

In certain aspects, the bimetallic materials are used as a coating, layer or insert for a dense fluidized bed (DFB) reactor component.

In certain aspects, the metal carbide ($M_xC_y$) is selected from the group consisting of WC, TaC, HfC, $Mo_2C$, NbC, ZrC, TiC, VC, $Cr_3C_2$, $Cr_7C_6$, $Cr_{23}C_6$, and mixtures of thereof.

In certain aspects, the metal carbide ($M_xC_y$) of the cermet composition constitutes about 10 vol. % to 90 vol. % of the total volume of the cermet composition, preferably about 20 vol. % to 80 vol. % of the total volume of the cermet composition.

In certain aspects, the average particle size of the metal carbide ($M_xC_y$) is below about 150 μm, preferably the average particle size of the metal carbide ($M_xC_y$) is typically below about 100 μm.

In certain aspects, the cermet composition further comprises at least one intermetallic phase that is formed from the metal alloy binder phase and a metal M from the metal carbide ($M_xC_y$). Preferably, the at least one intermetallic phase includes at least one sigma (σ) phase, mu (μ) phase, or Laves phase.

Dense fluidized bed (DFB) reactor components are also provided (e.g., coating, layer or insert), which comprise the bimetallic materials.

Methods for making the bimetallic materials are also provided, which comprise laser cladding the metal alloy binder phase onto the high temperature alloy substrate. Preferably, the laser cladding method is selected from the group consisting of plasma transfer arc (PTA) welding, powder plasma welding and high power direct diode (HPDD) laser.

Methods for improving the metal dusting corrosion, abrasion resistance and/or erosion resistance by laser cladding a cermet composition onto a high temperature alloy substrate are also provided. The methods comprise providing a high temperature alloy substrate selected from the group consisting of (i) Ni-based, high Cr alloys, (ii) FeNi-based alloys, (iii) FeNiCo-based alloys, (iv) NiCo-based alloys, (v) Ni-based alloys, (vi) Steam Cracker Alloys, (vii) Austenitic Stainless Steels and mixtures thereof. The cermet composition comprises the metal alloy binder phase and at least one ceramic phase material. Specifically, the metal alloy binder phase comprises: (i) about 28.0 to about 35.0 wt. % chromium (Cr); (ii) about 0.5 to about 2.9 wt. % carbon (C); (iii) about 4.1 to about 30.0 wt. % of an alloying element selected from the group consisting of Iron (Fe), Cobalt (Co), Aluminium (Al), Silicon (Si), Manganese (Mn), Copper (Cu), Titanium (Ti), Zirconium (Zr), Hafnium (Hf), Vanadium (V), Niobium (Nb), Tantalum (Ta), Molybdenum (Mo), Tungsten (W), and mixtures of thereof; and (iv) the balance being nickel (Ni), wherein the wt. % is based on the total weight of the alloy. The at least one ceramic phase material selected from the group consisting of metal carbides ($M_xC_y$), metal nitrides ($M_xN_y$), metal borides ($M_xB_y$), metal oxides ($M_xO_y$), metal carbonitrides ($M_xCN_y$), and mixtures of thereof; wherein M is at least one element selected from a group consisting of titanium (Ti), Zirconium (Zr), Hafnium (Hf), Vanadium (V), Niobium (Nb), Tantalum (Ta), Molybdenum (Mo), Tungsten (W), Iron (Fe), Nickel (Ni), Cobalt (Co), Chromium (Cr), Aluminium (Al), Silicon (Si), Manganese (Mn), and mixtures of thereof, x is a whole or fractional numerical value ranging from 1 to 26; and y is a whole or fractional numerical value ranging from 1 to 6. The bimetallic material is formed by combining an effective amount of the at least one ceramic phase material and the at least one metal alloy binder phase to form a mixture, and applying the mixture to the high temperature alloy substrate by laser.

Certain aspects involve laser cladding the cermet composition onto the high temperature alloy substrate. Preferably, the laser cladding method is selected from the group consisting of plasma transfer arc (PTA) welding, powder plasma welding and/or high power direct diode (HPDD) laser.

In certain aspects, a dense fluidized bed (DFB) reactor component, comprises the bimetallic material, wherein the DFB has a metal dusting corrosion rate less than 5 mils per year (mpy). In other aspects, the dense fluidized bed (DFB) reactor component, comprises the bimetallic material, wherein the DFB has an abrasion/erosion resistance value of at least about 5 times better than the abrasion/erosion resistance value of the substrate, preferably, an abrasion/erosion resistance value of at least about 7 times better than the abrasion/erosion resistance value of the substrate.

Embodiment D relates to bimetallic materials comprising (i) a high temperature alloy substrate, and (ii) a cermet composition. The high temperature alloy substrate comprises a high temperature alloy substrate selected from the group consisting of (i) Ni-based, high Cr alloys, (ii) FeNi-based alloys, (iii) FeNiCo-based alloys, (iv) NiCo-based alloys, (v) Ni-based alloys, (vi) Steam Cracker Alloys, (vii) Austenitic Stainless Steels and mixtures thereof. The cermet composition comprises: (a) at least one ceramic phase material comprising $Cr_{23}C_6$; and (b) at least one metal alloy binder phase comprising (i) about 28.0 to about 50.0 wt. % chromium (Cr); (ii) about <0.4 wt. % carbon (C); and (iii) the balance being nickel (Ni), wherein the wt. % is based on the total weight of the alloy. The bimetallic material is formed by combining an effective amount of the at least one ceramic phase material and the at least one metal alloy binder phase to form a mixture, and applying the mixture to the high temperature alloy substrate by a laser cladding method. Preferably, the laser cladding method is selected from the group consisting of plasma transfer arc (PTA) welding, powder plasma welding, and/or high power direct diode (HPDD) laser.

In certain aspects, the bimetallic material is used as a coating, layer or insert for a dense fluidized bed (DFB) reactor component.

In certain aspects, the ceramic phase material comprising $Cr_{23}C_6$ constitutes about 10 vol. % to about 90 vol. % of the total volume of the cermet composition, preferably, the ceramic phase material comprising $Cr_{23}C_6$ constitutes about 20 vol. % to about 80 vol. % of the total volume of the cermet composition.

In various aspects, the average particle size of the at least one ceramic phase material comprising $Cr_{23}C_6$ is below about 150 μm, preferably, the average particle size of the at least one ceramic phase material comprising $Cr_{23}C_6$ is below about 100 μm.

In various aspects, dense fluidized bed (DFB) reactor components (e.g., coating, layer or insert) are provided, which comprise the bimetallic materials.

In certain aspects, a dense fluidized bed (DFB) reactor component, comprises the bimetallic material, wherein the DFB has a metal dusting corrosion rate less than 5 mils per year (mpy). In other aspects, the dense fluidized bed (DFB) reactor component, comprises the bimetallic material, wherein the DFB has an abrasion/erosion resistance value of at least about 5 times better than the abrasion/erosion resistance value of the substrate, preferably, an abrasion/erosion resistance value of at least about 7 times better than the abrasion/erosion resistance value of the substrate.

Methods for making the bimetallic materials are also provided, which comprise laser cladding the metal alloy binder phase onto the high temperature alloy substrate. Preferably, the laser cladding method is selected from the group consisting of plasma transfer arc (PTA) welding, powder plasma welding and/or high power direct diode (HPDD) laser.

Methods are also provided for improving the metal dusting corrosion, abrasion resistance and/or erosion resistance by laser cladding a cermet composition onto a high temperature alloy substrate, comprising: (1) providing a high temperature alloy substrate selected from the group consisting of (i) Ni-based, high Cr alloys, (ii) FeNi-based alloys, (iii) FeNiCo-based alloys, (iv) NiCo-based alloys, (v) Ni-based alloys, (vi) Steam Cracker Alloys, (vii) Austenitic Stainless Steels and mixtures thereof; (2) providing a cermet composition that comprises: (a) at least one ceramic phase material comprising $Cr_{23}C_6$; and (b) at least one metal alloy binder phase comprising (i) about 28.0 to about 50.0 wt. % chromium (Cr); (ii) about <0.4 wt. % carbon (C); and (iii) the balance being nickel (Ni), wherein the wt. % is based on the total weight of the alloy; and (3) forming the bimetallic material by combining an effective amount of the at least one ceramic phase material and the at least one metal alloy binder phase to form a mixture, and (4) applying the mixture to the high temperature alloy substrate by laser. Preferably, the method comprises laser cladding the cermet composition onto the high temperature alloy substrate. The laser cladding method may be selected from the group consisting of plasma transfer arc (PTA) welding, powder plasma welding, and/or high power direct diode (HPDD) laser.

Embodiment E relates to a metal alloy composition comprising (i) about 17.1 to about 39.0 wt. % aluminum (Al); (ii) about 0.0 to about 10.0 wt. % of an alloying element selected from a group consisting of Iron (Fe), Cobalt (Co), Chromium (Cr), Silicon (Si), Manganese (Mn), Copper (Cu), titanium (Ti), Zirconium (Zr), Hafnium (Hf), Vanadium (V), Niobium (Nb), Tantalum (Ta), Molybdenum (Mo), Tungsten (W), and mixtures of thereof; and (iii) the balance being nickel (Ni), wherein the wt. % is based on the total weight of the metal alloy composition.

A cermet composition is also provided, which comprises (a) at least one ceramic phase material selected from the group consisting of metal carbides (MxCy), wherein: M is at least one element selected from a group consisting of titanium (Ti), Zirconium (Zr), Hafnium (Hf), Vanadium (V), Niobium (Nb), Tantalum (Ta), Molybdenum (Mo), Tungsten (W), Iron (Fe), Nickel (Ni), Cobalt (Co), Chromium (Cr), Aluminium (Al), Silicon (Si), Manganese (Mn), and mixtures of thereof, x is a whole or fractional numerical value ranging from 1 to 26; and y is a whole or fractional numerical value ranging from 1 to 6; and (b) at least one metal alloy binder phase comprising (i) about 17.1 to about 39.0 wt. % aluminum (Al); (ii) about 0.0 to about 10.0 wt. % of an alloying element selected from a group consisting of Iron (Fe), Cobalt (Co), Chromium (Cr), Silicon (Si), Manganese (Mn), Copper (Cu), titanium (Ti), Zirconium (Zr), Hafnium (Hf), Vanadium (V), Niobium (Nb), Tantalum (Ta), Molybdenum (Mo), Tungsten (W), and mixtures of thereof; and (iii) the balance being nickel (Ni), wherein the wt. % is based on the total weight of the at least one metal alloy binder phase.

Bimetallic materials are also provided, which comprise (i) a high temperature alloy substrate, and (ii) a cermet composition. The high temperature alloy substrate comprises a high temperature alloy substrate selected from the group consisting of (i) Ni-based, high Cr alloys, (ii) FeNi-based alloys, (iii) FeNiCo-based alloys, (iv) NiCo-based alloys, (v) Ni-based alloys, (vi) Steam Cracker Alloys, (vii) Austenitic Stainless Steels, and mixtures thereof. The cermet composition comprises: (a) at least one ceramic phase material selected from the group consisting of metal carbides ($M_xC_y$), and (b) at least one metal alloy binder phase comprising (i) about 17.1 to about 39.0 wt. % aluminum (Al); (ii) about 0.0 to about 10.0 wt. % of an alloying element selected from a group consisting of Iron (Fe), Cobalt (Co), Chromium (Cr), Silicon (Si), Manganese (Mn), Copper (Cu), titanium (Ti), Zirconium (Zr), Hafnium (Hf), Vanadium (V), Niobium (Nb), Tantalum (Ta), Molybdenum (Mo), Tungsten (W), and mixtures of thereof; and (iii) the balance being nickel (Ni), wherein the wt. % is based on the total weight of the at least one metal alloy binder phase. M is at least one element selected from a group consisting of titanium (Ti), Zirconium (Zr), Hafnium (Hf), Vanadium (V), Niobium (Nb), Tantalum (Ta), Molybdenum (Mo), Tungsten (W), Iron (Fe), Nickel (Ni), Cobalt (Co), Chromium (Cr), Aluminium (Al), Silicon (Si), Manganese (Mn), and mixtures of thereof, x is a whole or fractional numerical value ranging from 1 to 26; and y is a whole or fractional numerical value ranging from 1 to 6. The bimetallic material is formed by laser cladding.

In certain aspects, the metal carbide ($M_xC_y$) is selected from the group consisting of WC, TaC, HfC, $Mo_2C$, NbC, ZrC, TiC, VC, $Cr_3C_2$, $Cr_7C_6$, $Cr_{23}C_6$, and mixtures of thereof.

In various aspects, the ceramic phase material constitutes about 10 vol. % to about 70 vol. % of the total volume of the cermet composition, preferably the ceramic phase material constitutes about 20 vol. % to about 60 vol. % of the total volume of the cermet composition.

In various aspects, the particle size of the metal carbide ($M_xC_y$) is below about 150 μm, preferably the particle size of the metal carbide ($M_xC_y$) is below about 100 μm.

In certain aspects, the cermet composition further comprises at least one intermetallic phase that is formed from the intermetallic β-NiAl metal alloy binder phase and a metal M of the metal carbide ($M_xC_y$). The at least one intermetallic phase may include at least one sigma (σ) phase, mu (μ) phase, or Laves phase.

Dense fluidized bed (DFB) reactor components (e.g., coatings, inserts or layers), comprising the bimetallic materials are also provided.

In certain aspects, a dense fluidized bed (DFB) reactor component, comprises the bimetallic material, wherein the DFB has a metal dusting corrosion rate less than 5 mils per year (mpy). In other aspects, the dense fluidized bed (DFB) reactor component, comprises the bimetallic material, wherein the DFB has an abrasion/erosion resistance value of at least about 5 times better than the abrasion/erosion resistance value of the substrate, preferably, an abrasion/erosion resistance value of at least about 7 times better than the abrasion/erosion resistance value of the substrate.

Methods for producing a bimetallic material are also provided, wherein the bimetallic material comprises (i) a high temperature alloy substrate, and (ii) a cermet composition, wherein the cermet composition comprises: (a) at least one ceramic phase comprising a metal carbide ($M_xC_y$) and (b) at least one intermetallic β-NiAl metal alloy binder phase comprising (i) about 17.1 to about 39.0 wt. % aluminum (Al); (ii) about 0.0 to about 10.0 wt. % of an alloying element selected from a group consisting of Iron (Fe), Cobalt (Co), Chromium (Cr), Silicon (Si), Manganese (Mn), Copper (Cu), titanium (Ti), Zirconium (Zr), Hafnium (Hf), Vanadium (V), Niobium (Nb), Tantalum (Ta), Molybdenum (Mo), Tungsten (W), and mixtures of thereof; and (iii) the balance being nickel (Ni), wherein the wt. % is based on the total weight of the alloy. M is at least one element selected from a group consisting of titanium (Ti), Zirconium (Zr), Hafnium (Hf), Vanadium (V), Niobium (Nb), Tantalum (Ta), Molybdenum (Mo), Tungsten (W), Iron (Fe), Nickel (Ni), Cobalt (Co), Chromium (Cr), Aluminium (Al), Silicon (Si), Manganese (Mn), and mixtures of thereof, x is a whole or fractional numerical value ranging from 1 to 26; and y is a whole or fractional numerical value ranging from 1 to 6. The methods may comprise (i) mixing the at least one ceramic phase comprising a metal carbide ($M_xC_y$) and the at least one intermetallic β-NiAl metal alloy binder phase to form a mixture; and (ii) laser cladding the mixture on a high temperature alloy substrate to provide a bimetallic material, wherein the high temperature alloy substrate is selected from the group consisting of (i) Ni-based, high Cr alloys, (ii) FeNi-based alloys, (iii) FeNiCo-based alloys, (iv) NiCo-based alloys, (v) Ni-based alloys, (vi) Steam Cracker Alloys, (vii) Austenitic Stainless Steels and mixtures thereof.

In certain aspects, the metal carbide ($M_xC_y$) is selected from the group consisting of WC, TaC, HfC, $Mo_2C$, NbC, ZrC, TiC, VC, $Cr_3C_2$, $Cr_7C_6$, $Cr_{23}C_6$, and mixtures of thereof.

In certain aspects, the laser cladding method is selected from the group consisting of plasma transfer arc (PTA) welding, powder plasma welding and/or high power direct diode (HPDD) laser.

Methods are also provided for improving the metal dusting corrosion, abrasion resistance and/or erosion resistance by laser cladding a cermet composition onto a high temperature alloy substrate, comprising: (A) providing a high temperature alloy substrate selected from the group consisting of (i) Ni-based, high Cr alloys, (ii) FeNi-based alloys, (iii) FeNiCo-based alloys, (iv) NiCo-based alloys, (v) Ni-based alloys, (vi) Steam Cracker Alloys, (vii) Austenitic Stainless Steels and mixtures thereof; (B) mixing the at least one ceramic phase comprising a metal carbide ($M_xC_y$) and the at least one intermetallic β-NiAl metal alloy binder phase to form a mixture; and (C) laser cladding the mixture on a high temperature alloy substrate to provide a bimetallic material. The cermet composition comprises: (a) at least one ceramic phase material comprising $Cr_{23}C_6$; and (b) at least one metal alloy binder phase comprising (i) about 17.1 to about 39.0 wt. % aluminum (Al); (ii) about 0.0 to about 10.0 wt. % of an alloying element selected from a group consisting of Iron (Fe), Cobalt (Co), Chromium (Cr), Silicon (Si), Manganese (Mn), Copper (Cu), titanium (Ti), Zirconium (Zr), Hafnium (Hf), Vanadium (V), Niobium (Nb), Tantalum (Ta), Molybdenum (Mo), Tungsten (W), and mixtures of thereof; and (iii) the balance being nickel (Ni), wherein the wt. % is based on the total weight of the alloy.

In certain aspects, the methods comprise laser cladding the cermet composition onto the high temperature alloy substrate. Preferably, the laser cladding method is selected from the group consisting of plasma transfer arc (PTA) welding, powder plasma welding and/or high power direct diode (HPDD) laser.

Embodiment F relates to an alloy composition comprising (i) about 54.8 to about 59.9 wt. % tin (Sn); (ii) about 0.0 to about 10.0 wt. % of an alloying element selected from the group consisting of Iron (Fe), Cobalt (Co), Chromium (Cr), Aluminium (Al), Silicon (Si), Manganese (Mn), Copper (Cu), Titanium (Ti), Zirconium (Zr), Hafnium (Hf), Vanadium (V), Niobium (Nb), Tantalum (Ta), Molybdenum (Mo), Tungsten (W), and mixtures of thereof; and (iii) the balance being nickel (Ni), wherein the wt. % is based on the total weight of the intermetallic $Ni_3Sn_2$ alloy composition. Preferably, the alloy composition comprises an intermetallic $Ni_3Sn_2$ alloy.

Cermet compositions are also provided, which comprise: (a) at least one ceramic phase material selected from the group consisting of metal carbides (MxCy); wherein: M is at least one element selected from a group consisting of titanium (Ti), Zirconium (Zr), Hafnium (Hf), Vanadium (V), Niobium (Nb), Tantalum (Ta), Molybdenum (Mo), Tungsten (W), Iron (Fe), Nickel (Ni), Cobalt (Co), Chromium (Cr), Aluminium (Al), Silicon (Si), Manganese (Mn), and mixtures of thereof, x is a whole or fractional numerical value ranging from 1 to 26; and y is a whole or fractional numerical value ranging from 1 to 6; and (b) at least one alloy composition comprising (i) about 54.8 to about 59.9 wt. % tin (Sn); (ii) about 0.0 to about 10.0 wt. % of an alloying element selected from the group consisting of Iron (Fe), Cobalt (Co), Chromium (Cr), Aluminium (Al), Silicon (Si), Manganese (Mn), Copper (Cu), Titanium (Ti), Zirconium (Zr), Hafnium (Hf), Vanadium (V), Niobium (Nb), Tantalum (Ta), Molybdenum (Mo), Tungsten (W), and mixtures of thereof; and (iii) the balance being nickel (Ni), wherein the wt. % is based on the total weight of the alloy composition.

Bimetallic materials are also provided, which comprise (i) a high temperature alloy substrate, and (ii) a cermet composition, wherein the bimetallic material is formed by laser cladding. The high temperature alloy substrate comprises a high temperature alloy substrate selected from the group consisting of (i) Ni-based, high Cr alloys, (ii) FeNi-based alloys, (iii) FeNiCo-based alloys, (iv) NiCo-based alloys, (v) Ni-based alloys, (vi) Steam Cracker Alloys, (vii) Austenitic Stainless Steels and mixtures thereof. The cermet composition comprises: (a) at least one ceramic phase material selected from the group consisting of metal carbides ($M_xC_y$); wherein: M is at least one element selected from a group consisting of titanium (Ti), Zirconium (Zr), Hafnium (Hf), Vanadium (V), Niobium (Nb), Tantalum (Ta), Molybdenum (Mo), Tungsten (W), Iron (Fe), Nickel (Ni), Cobalt (Co), Chromium (Cr), Aluminium (Al), Silicon (Si), Manganese (Mn), and mixtures of thereof, x is a whole or fractional numerical value ranging from 1 to 26; and y is a whole or fractional numerical value ranging from 1 to 6. The at least one alloy composition comprises (i) about 54.8 to about 59.9 wt. % tin (Sn); (ii) about 0.0 to about 10.0 wt. % of an alloying element selected from the group consisting of Iron (Fe), Cobalt (Co), Chromium (Cr), Aluminium (Al), Silicon (Si), Manganese (Mn), Copper (Cu), Titanium (Ti), Zirconium (Zr), Hafnium (Hf), Vanadium (V), Niobium (Nb), Tantalum (Ta), Molybdenum (Mo), Tungsten (W), and mixtures of thereof; and (iii) the balance being nickel (Ni), wherein the wt. % is based on the total weight of the alloy composition.

In certain aspects, metal carbide ($M_xC_y$) may be selected from the group consisting of WC, TaC, HfC, $Mo_2C$, NbC, ZrC, TiC, VC, $Cr_3C_2$, $Cr_7C_6$, $Cr_{23}C_6$, and mixtures of thereof.

In certain aspects, the metal carbide ($M_xC_y$) of the cermet composition constitutes about 10 vol. % to about 70 vol. % of the total volume of the cermet composition, preferably the metal carbide ($M_xC_y$) of the cermet composition constitutes about 20 vol. % to about 60 vol. % of the total volume of the cermet composition.

In certain aspects, the particle size of the metal carbide ($M_xC_y$) is below about 150 μm, preferably the particle size of the metal carbide ($M_xC_y$) is below about 100 μm.

In certain aspects, the cermet composition further comprises at least one intermetallic phase that is formed from the metal alloy binder phase and a metal M of the metal carbide ($M_xC_y$), wherein M is selected from the group consisting of titanium (Ti), Zirconium (Zr), Hafnium (Hf), Vanadium (V), Niobium (Nb), Tantalum (Ta), Molybdenum (Mo), Tungsten (W), Iron (Fe), Nickel (Ni), Cobalt (Co), Chromium (Cr), Aluminium (Al), Silicon (Si), Manganese (Mn), and mixtures of thereof. For example, the at least one intermetallic phase includes at least one sigma (σ) phase, mu (μ) phase, or Laves phase.

Certain aspects relate to a dense fluidized bed (DFB) reactor component (e.g., coating, layer or insert), which comprises the bimetallic material.

In certain aspects, a dense fluidized bed (DFB) reactor component, comprises the bimetallic material, wherein the DFB has a metal dusting corrosion rate less than 5 mils per year (mpy). In other aspects, the dense fluidized bed (DFB) reactor component, comprises the bimetallic material, wherein the DFB has an abrasion/erosion resistance value of at least about 5 times better than the abrasion/erosion resistance value of the substrate, preferably, an abrasion/erosion resistance value of at least about 7 times better than the abrasion/erosion resistance value of the substrate.

Methods are also provided for producing a bimetallic material, wherein the bimetallic material comprises (i) a high temperature alloy substrate, and (ii) a cermet composition. The cermet composition comprises: (a) at least one ceramic phase comprising a metal carbide ($M_xC_y$), and (b) at least one intermetallic $Ni_3Sn_2$ alloy composition comprising (i) about 54.8 to about 59.9 wt. % tin (Sn); (ii) 0.0 to about 10.0 wt. % of an alloying element selected from the group consisting of Iron (Fe), Cobalt (Co), Chromium (Cr), Aluminium (Al), Silicon (Si), Manganese (Mn), Copper (Cu), Titanium (Ti), Zirconium (Zr), Hafnium (Hf), Vanadium (V), Niobium (Nb), Tantalum (Ta), Molybdenum (Mo), Tungsten (W), and mixtures of thereof; and (iii) the balance being nickel (Ni), wherein the wt. % is based on the total weight of the intermetallic $Ni_3Sn_2$ alloy composition. M is at least one element selected from a group consisting of titanium (Ti), Zirconium (Zr), Hafnium (Hf), Vanadium (V), Niobium (Nb), Tantalum (Ta), Molybdenum (Mo), Tungsten (W), Iron (Fe), Nickel (Ni), Cobalt (Co), Chromium (Cr), Aluminium (Al), Silicon (Si), Manganese (Mn), and mixtures of thereof, x is a whole or fractional numerical value ranging from 1 to 26; and y is a whole or fractional numerical value ranging from 1 to 6. The method comprises (i) mixing the at least one ceramic phase comprising a metal carbide ($M_xC_y$) and the at least one intermetallic $Ni_3Sn_2$ alloy composition to form a mixture; and (ii) laser cladding the mixture on a high temperature alloy substrate to provide a bimetallic material. The high temperature alloy substrate is selected from the group consisting of (i) Ni-based, high Cr alloys, (ii) FeNi-based alloys, (iii) FeNiCo-based alloys, (iv) NiCo-based alloys, (v) Ni-based alloys, (vi) Steam Cracker Alloys, (vii) Austenitic Stainless Steels and mixtures thereof.

In certain aspects, the laser cladding method is selected from the group consisting of plasma transfer arc (PTA) welding, powder plasma welding and high power direct diode (HPDD) laser.

Methods are provided for improving the metal dusting corrosion, abrasion resistance and/or erosion resistance of a high temperature alloy substrate, comprising: (A) providing a high temperature alloy substrate selected from the group consisting of (i) Ni-based, high Cr alloys, (ii) FeNi-based alloys, (iii) FeNiCo-based alloys, (iv) NiCo-based alloys, (v) Ni-based alloys, (vi) Steam Cracker Alloys, (vii) Austenitic Stainless Steels and mixtures thereof; (B) mixing the at least one ceramic phase comprising a metal carbide ($M_xC_y$) and the at least one metal alloy binder phase to form a mixture; and (C) laser cladding the mixture on a high temperature alloy substrate to provide a bimetallic material. The cermet composition comprises: (a) at least one ceramic phase comprising a metal carbide ($M_xC_y$) and (b) at least one metal alloy binder phase comprising (i) about 54.8 to about 59.9 wt. % tin (Sn); (ii) about 0.0 to about 10.0 wt. % of an alloying element selected from the group consisting of Iron (Fe), Cobalt (Co), Chromium (Cr), Aluminium (Al), Silicon (Si), Manganese (Mn), Copper (Cu), Titanium (Ti), Zirconium (Zr), Hafnium (Hf), Vanadium (V), Niobium (Nb), Tantalum (Ta), Molybdenum (Mo), Tungsten (W), and mixtures of thereof; and (iii) the balance being nickel (Ni), wherein the wt. % is based on the total weight of the alloy. M is at least one element selected from a group consisting of titanium (Ti), Zirconium (Zr), Hafnium (Hf), Vanadium (V), Niobium (Nb), Tantalum (Ta), Molybdenum (Mo), Tungsten (W), Iron (Fe), Nickel (Ni), Cobalt (Co), Chromium (Cr), Aluminium (Al), Silicon (Si), Manganese (Mn), and mixtures of thereof, x is a whole or fractional numerical value ranging from 1 to 26; and y is a whole or fractional numerical value ranging from 1 to 6.

Preferably, the methods comprise laser cladding the cermet composition onto the high temperature alloy substrate. The laser cladding method may be selected from the group consisting of plasma transfer arc (PTA) welding, powder plasma welding and/or high power direct diode (HPDD) laser.

Embodiment G relates to alloy compositions comprising (i) about 28.0 to about 44.0 wt. % chromium (Cr); (ii) about 3.5 to about 17.0 wt. % aluminum (Al); (iii) about 0.0 to about 0.02 wt. % of an alloying element selected from the group consisting of Iron (Fe), Cobalt (Co), Silicon (Si), Manganese (Mn), Copper (Cu), Titanium (Ti), Zirconium (Zr), Hafnium (Hf), Vanadium (V), Niobium (Nb), Tantalum (Ta), Molybdenum (Mo), Tungsten (W), Carbon (C), Boron (B), Phosphorus (P) and mixtures of thereof; and (iv) the balance being nickel (Ni), wherein the wt. % is based on the total weight of the alloy composition.

In certain aspects, the alloy composition further comprises hard phases selected from the group consisting of α-Cr, γ'-Ni$_3$Al and mixtures thereof.

In certain aspects, the alloy composition does not contain an alloying element.

In a preferred aspect, the alloy composition comprises (i) about 28.0 to about 41.0 wt. % chromium (Cr); and (ii) about 3.5 to about 5.0 wt. % aluminum (Al), wherein the wt. % is based on the total weight of the alloy composition.

In a preferred aspect, the alloy composition comprises (i) about 28.0 to about 34.0 wt. % chromium (Cr); and (ii) about 5.1 to about 17.0 wt. % aluminum (Al), wherein the wt. % is based on the total weight of the alloy composition.

In certain aspects, the alloy composition may comprise a nominal composition (wt. %) comprising:
Bal.Ni:38.0Cr:3.8Al
Bal.Ni:40.0Cr:4.0Al
Bal.Ni:30.0Cr:9.0Al
Bal.Ni:32.0Cr:8.0Al; or
Bal.Ni:34.0Cr:7.0Al.

Bimetallic material are provided, which comprise (i) a high temperature alloy substrate, and (ii) a cermet composition. The high temperature alloy substrate comprises a high temperature alloy substrate selected from the group consisting of (i) Ni-based, high Cr alloys, (ii) FeNi-based alloys, (iii) FeNiCo-based alloys, (iv) NiCo-based alloys, (v) Ni-based alloys, (vi) Steam Cracker Alloys, (vii) Austenitic Stainless Steels and mixtures thereof, wherein the bimetallic material is formed by laser cladding. The cermet composition comprises: (a) at least one ceramic phase material selected from the group consisting of metal carbides having the formula $M_xC_y$; and (b) at least one intermetallic alloy composition comprising (i) about 28.0 to about 44.0 wt. % chromium (Cr); (ii) about 3.5 to about 17.0 wt. % aluminum (Al); (iii) 0.0 to about 0.02 wt. % of an alloying element selected from the group consisting of Iron (Fe), Cobalt (Co), Silicon (Si), Manganese (Mn), Copper (Cu), Titanium (Ti), Zirconium (Zr), Hafnium (Hf), Vanadium (V), Niobium (Nb), Tantalum (Ta), Molybdenum (Mo), Tungsten (W), Carbon (C), Boron (B), Phosphorus (P) and mixtures of thereof; and (iv) the balance being nickel (Ni), wherein the wt. % is based on the total weight of the intermetallic alloy composition. M is at least one element selected from a group consisting of titanium (Ti), Zirconium (Zr), Hafnium (Hf), Vanadium (V), Niobium (Nb), Tantalum (Ta), Molybdenum (Mo), Tungsten (W), Iron (Fe), Nickel (Ni), Cobalt (Co), Chromium (Cr), Aluminium (Al), Silicon (Si), Manganese (Mn), and mixtures of thereof, x is a whole or fractional numerical value ranging from 1 to 26; and y is a whole or fractional numerical value ranging from 1 to 6.

In certain aspects, the metal carbide ($M_xC_y$) is selected from the group consisting of WC, TaC, HfC, Mo$_2$C, NbC, ZrC, TiC, VC, Cr$_3$C$_2$, Cr$_7$C$_6$, Cr$_{23}$C$_6$, and mixtures of thereof. For example, the metal carbide ($M_xC_y$) may be Cr$_{23}$C$_6$.

In certain aspects, the metal carbide ($M_xC_y$) of the cermet composition constitutes about 10 vol. % to about 90 vol. % of the total volume of the cermet composition, preferably the metal carbide ($M_xC_y$) of the cermet composition constitutes about 20 vol. % to about 80 vol. % of the total volume of the cermet composition.

In certain aspects, the particle size of the metal carbide ($M_xC_y$) is typically below about 150 μm, preferably, the particle size of the metal carbide ($M_xC_y$) is typically below about 100 μm.

In certain aspects, the cermet composition further comprises at least one intermetallic phase that is formed from the metal alloy binder phase and a metal M of the metal carbide ($M_xC_y$), wherein M is selected from the group consisting of titanium (Ti), Zirconium (Zr), Hafnium (Hf), Vanadium (V), Niobium (Nb), Tantalum (Ta), Molybdenum (Mo), Tungsten (W), Iron (Fe), Nickel (Ni), Cobalt (Co), Chromium (Cr), Aluminium (Al), Silicon (Si), Manganese (Mn), and mixtures of thereof. For example, the at least one intermetallic phase includes at least one sigma (σ) phase, mu (μ) phase, or Laves phase.

In certain aspects, a dense fluidized bed (DFB) reactor component (e.g., a layer, coating or insert) is provided, which comprises the bimetallic material.

In certain aspects, a dense fluidized bed (DFB) reactor component, comprises the bimetallic material, wherein the DFB has a metal dusting corrosion rate less than 5 mils per year (mpy). In other aspects, the dense fluidized bed (DFB) reactor component, comprises the bimetallic material, wherein the DFB has an abrasion/erosion resistance value of at least about 5 times better than the abrasion/erosion resistance value of the substrate, preferably, an abrasion/erosion resistance value of at least about 7 times better than the abrasion/erosion resistance value of the substrate.

Method are also provided, for producing a bimetallic material, wherein the bimetallic material comprises (a) a high temperature alloy substrate, and (b) a cermet composition; comprising: (i) mixing the at least one ceramic phase comprising a metal carbide (MxCy) and the at least one alloy composition to form a mixture; and (ii) laser cladding the mixture on a high temperature alloy substrate to provide a bimetallic material, wherein the high temperature alloy substrate is selected from the group consisting of (i) Ni-based, high Cr alloys, (ii) FeNi-based alloys, (iii) FeNiCo-based alloys, (iv) NiCo-based alloys, (v) Ni-based alloys, (vi) Steam Cracker Alloys, (vii) Austenitic Stainless Steels and mixtures thereof. The cermet composition comprises: (a) at least one ceramic phase comprising a metal carbide ($M_xC_y$) and (b) at least one alloy composition comprising (i) about 28.0 to about 44.0 wt. % chromium (Cr); (ii) about 3.5 to about 17.0 wt. % aluminum (Al); (iii) 0.0 to about 0.02 wt. % of an alloying element selected from the group consisting of Iron (Fe), Cobalt (Co), Silicon (Si), Manganese (Mn), Copper (Cu), Titanium (Ti), Zirconium (Zr), Hafnium (Hf), Vanadium (V), Niobium (Nb), Tantalum (Ta), Molybdenum (Mo), Tungsten (W), Carbon (C), Boron (B), Phosphorus (P) and mixtures of thereof; and (iv) the balance being nickel (Ni), wherein the wt. % is based on the total weight of the intermetallic alloy composition. M is at least one element selected from a group consisting of titanium (Ti), Zirconium (Zr), Hafnium (Hf), Vanadium (V), Niobium (Nb), Tantalum (Ta), Molybdenum (Mo), Tungsten (W), Iron (Fe), Nickel (Ni), Cobalt (Co), Chromium (Cr), Aluminium (Al), Silicon (Si), Manganese (Mn), and mixtures of thereof, x is a whole or fractional numerical value ranging from 1 to 26; and y is a whole or fractional numerical value ranging from 1 to 6.

Preferably, the laser cladding method is selected from the group consisting of plasma transfer arc (PTA) welding, powder plasma welding, and/or high power direct diode (HPDD) laser.

In certain aspects, methods are provided for improving the metal dusting corrosion, abrasion resistance and/or erosion resistance of a high temperature alloy substrate, comprising: (A) providing a high temperature alloy substrate selected from the group consisting of (i) Ni-based, high Cr alloys, (ii) FeNi-based alloys, (iii) FeNiCo-based alloys, (iv) NiCo-based alloys, (v) Ni-based alloys, (vi) Steam Cracker Alloys, (vii) Austenitic Stainless Steels and mixtures thereof; (B) providing a cermet composition; (C) mixing the at least one ceramic phase comprising a metal carbide ($M_xC_y$) and the at least one intermetallic β-NiAl metal alloy binder phase to form a mixture; and (C) laser cladding the mixture on a high temperature alloy substrate to provide a bimetallic material. The cermet composition comprises: (a) at least one ceramic phase comprising a metal carbide ($M_xC_y$), and (b) at least one metal alloy binder phase comprising (i) about 28.0 to 44.0 wt. % chromium (Cr); (ii) about 3.5 to 17.0 wt. % aluminum (Al); (iii) 0.0 to about 0.02 wt. % of an alloying element selected from the group consisting of Iron (Fe), Cobalt (Co), Silicon (Si), Manganese (Mn), Copper (Cu), Titanium (Ti), Zirconium (Zr), Hafnium (Hf), Vanadium (V), Niobium (Nb), Tantalum (Ta), Molybdenum (Mo), Tungsten (W), Carbon (C), Boron (B), Phosphorus (P) and mixtures of thereof; and (iv) the balance being nickel (Ni), wherein the wt. % is based on the total weight of the alloy. M is at least one element selected from a group consisting of titanium (Ti), Zirconium (Zr), Hafnium (Hf), Vanadium (V), Niobium (Nb), Tantalum (Ta), Molybdenum (Mo), Tungsten (W), Iron (Fe), Nickel (Ni), Cobalt (Co), Chromium (Cr), Aluminium (Al), Silicon (Si), Manganese (Mn), and mixtures of thereof, x is a whole or fractional numerical value ranging from 1 to 26; and y is a whole or fractional numerical value ranging from 1 to 6.

In certain aspects, the cermet composition is laser cladded onto the high temperature alloy substrate. Preferably, the laser cladding method may be selected from the group consisting of plasma transfer arc (PTA) welding, powder plasma welding, and/or high power direct diode (HPDD) laser.

Each of the embodiments above may further have one or more of the following additional elements, in any combination:

Element 1: The cermet composition(s) may be used for any component or insert of a dense fluidized bed (DFB) reactor. The DFB component may comprise a lining, insert and/or coating comprising the cermet composition(s).

Element 2: The cermet composition(s) may be used in fluids and solids process applications, e.g., requiring erosion resistance. In a preferred embodiment, the cermet composition is used as a coating, a lining or an insert, e.g., as a DFB reactor component. In certain embodiments the cermet composition(s) are used for applications relating to oil and gas exploration and production, refining and petrochemical processing.

Element 3: The metal alloy binder phase of formula PQR may have a nominal composition (wt. %) selected from the group consisting of:
Bal.Co:10Ni:23Cr:7W:3.5Ta:0.3Ti:0.5Zr:0.6C
Bal.Co:30Cr:13W:2.5C:<2.0Ni:<1.0Mo:<2.0Fe:<2.0Si
Bal.Co:28.5Cr:4.6W:1.2C:<2.0Ni:<1.0Mo:<2.0Fe:<2.0Si
Bal.Co:30Cr:8.5W:1.45C:<2.0Ni:<1.0Mo:<2.0Fe:<2.0Si
Bal.Co:32.5Cr:17.5W:2.55C:<2.0Ni:<1.0Mo:<2.0Fe:<1.0Si
Bal.Ni:29Cr:7.5W:2.0Fe:2.4Si: 1.2C:1.4B
Bal.Fe:45Ni:35Cr:4.0W:2.0C
Bal.Fe:45Ni:35Cr:2.0Ti:2.00; or
Bal.Fe:45Ni:35Cr:2.0Nb:2.0C.

Element 4: The cermet composition may comprise less than about 3 vol. % porosity, preferably less than about 1 vol. % porosity.

Element 5: In certain preferred aspects, M is selected from the group consisting of Titanium (Ti), Zirconium (Zr), Hafnium (Hf), Vanadium (V), Niobium (Nb), Tantalum (Ta), and mixtures of thereof.

Element 6: In certain aspects, R is carbon (C) and the at least one ceramic phase comprises a metal carbide of formula $M_xC_y$. For example, the metal carbide of formula $M_xC_y$ may be selected from the group consisting of WC, TaC, HfC, $Mo_2C$, NbC, ZrC, TiC, VC, $Cr_3C_2$, $Cr_7C_6$, $Cr_{23}C_6$, and mixtures of thereof.

Element 7: The ceramic phase may constitute about 5 vol. % to about 80 vol. % of the total volume of the cermet composition. Preferably, the ceramic phase constitutes about 20 vol. % to about 60 vol. % of the total volume of the cermet composition.

Element 8: The ceramic phase may comprise a metal carbide ($M_xC_y$) and the ceramic phase constitutes about 5 vol. % to about 80 vol. % of the total volume of the cermet composition. Preferably, the ceramic phase constitutes about 20 vol. % to about 60 vol. % of the total volume of the cermet composition.

Element 9: The ceramic phase may comprise metal carbide ($M_xC_y$) particles, having a particle size below about 150 μm, preferably below about 100 μm.

Element 10: The high temperature alloy substrate may have a nominal composition (wt. %) selected from the group consisting of:
Bal.Ni:4Fe:28Cr:3.1Al:0.7Nb
Bal.Ni:3Fe:30Cr:2Cu:2Mo:1.6Si
Bal.Ni:1Fe:31Cr:5.4Mo:3.5Cu:0.3Al
Bal.Ni:29Cr:2.0Al:0.5Fe
Bal.Fe:40Ni:22Cr:3.3Mo:1.9Cu:0.8Ti
Bal.Fe:46Ni:21Cr:3.3Al:0.4Ti:0.4Mn
Bal.Fe:35Ni:26Cr:1.6Si:1.3Mn:0.2N:RE
Bal.Fe:33Ni:21Cr:0.5Al:0.5Ti
Bal.Fe:34Ni:26Cr:1Mn:1Si:0.5Al:0.6Ti
Bal.Fe:33Ni:26Cr:1.0Nb:1.5Si:1.3Min
Bal.Fe:19Ni:18Co:22Cr:2.8Mo:3.0W
Bal.Ni:13Co:21Cr:9.9Mo:1Al:1Fe:0.3T
Bal.Ni:15Co:23.5Cr:0.5Nb:0.5Ti:0.2Al
Bal.Ni:30Co:26Cr:2.6Si:0.6Mn
Bal.Ni:4Fe:28Cr:3.1Al:0.7Nb
Bal.Ni:5Fe:21Cr:8.8Mo:3.7Nb
Bal.Ni:10Fe:25Cr:2.3Al:0.6Mn
Bal.Ni:13Fe:23Cr:1.3Al
Bal.Ni:9Fe:16Cr:0.3Si:0.2Mn
Bal.Ni:4Fe:17Cr:4.3Al:0.4Mn
Bal.Ni:1Fe:22Cr:14W:1.3Mo:0.5Si
Bal.Fe:43Ni:31Cr:1.8Si:1.0Mn:0.5Nb:0.5C
Bal.Fe:33Ni:25Cr:3.0Al:0.5C Bal.Fe:45Ni:30Cr:4.0Al:0.5Nb:0.45C
Bal.Fe:45Ni:25Cr:4.0Al:0.45C
Bal.Fe:8Ni:18Cr
Bal.Fe:12Ni:18Cr:2.5Mo
Bal.Fe:10Ni:18Cr:1.0Nb
Bal.Fe:10Ni:18Cr:0.7Ti; and
Bal.Fe:20Ni:25Cr.

Element 11: The cermet composition(s) may also be used in certain methods for improving the metal dusting corrosion, abrasion resistance and/or erosion resistance of a dense fluidized bed (DFB) reactor component (e.g., lining, insert and/or coating), wherein the DFB reactor component comprises a high temperature alloy substrate, selected from the group consisting of (i) Ni-based, high Cr alloys, (ii) FeNi-based alloys, (iii) FeNiCo-based alloys, (iv) NiCo-based alloys, (v) Ni-based alloys, (vi) Steam Cracker Alloys, (vii) Austenitic Stainless Steels, and mixtures thereof. The methods comprise (1) providing a cermet composition comprising (a) at least one ceramic phase material selected from the group consisting of metal carbides ($M_xC_y$), metal nitrides ($M_xN_y$), metal borides ($M_xB_y$), metal oxides ($M_xO_y$), metal carbonitrides ($M_xCN_y$), and mixtures of thereof and (b) at least one metal alloy binder phase of formula PQR, and (2) applying the cermet composition to the DFB reactor component by a laser cladding method, wherein the cermet composition is formed in-situ from the metal alloy binder phase by precipitation. M is at least one element selected from a group consisting of titanium (Ti), Zirconium (Zr), Hafnium (Hf), Vanadium (V), Niobium (Nb), Tantalum (Ta), Molybdenum (Mo), Tungsten (W), Iron (Fe), Nickel (Ni), Cobalt (Co), Chromium (Cr), Aluminium (Al), Silicon (Si), Manganese (Mn), and mixtures of thereof: x is a whole or fractional numerical value ranging from 1 to 26; and y is a whole or fractional numerical value ranging from 1 to 6. P is at least one base metal element selected from a group consisting of Iron (Fe), Nickel (Ni), Cobalt (Co), and mixtures of thereof; Q is at least one alloying element selected from a group consisting of Chromium (Cr), Aluminium (Al), Silicon (Si), Manganese (Mn), Copper (Cu), titanium (Ti), Zirconium (Zr), Hafnium (Hf), Vanadium (V), Niobium (Nb), Tantalum (Ta), Molybdenum (Mo), Tungsten (W), and mixtures of thereof, and R is at least one ceramic forming element selected from a group consisting of carbon (C), nitrogen (N), boron (B), oxygen (O), and mixture of thereof.

Element 12: The dense fluidized bed (DFB) reactor component comprising the cermet composition(s) may have a metal dusting corrosion rate of less than about 5 mils per year (mpy).

Element 13: The dense fluidized bed (DFB) reactor component comprising the cermet composition(s) may have an abrasion/erosion resistance value of at least about 5 times better than the abrasion resistance value of the substrate, and preferably about 7 times better than the abrasion resistance value of the substrate.

Element 14: The dense fluidized bed (DFB) reactor component comprising the cermet composition(s) may have an erosion resistance value of at least about 5 times better than the erosion resistance value of the substrate, and preferably about 7 times better than the erosion resistance value of the substrate.

Element 15: The cermet composition(s) may be formed in-situ from the metal alloy binder phase by a laser cladding method. In certain aspects, the laser cladding method is selected from the group consisting of plasma transfer arc (PTA) welding, and powder plasma welding. In certain aspects, the laser cladding method is high power direct diode (HPDD) laser.

Element 16: The dispersed ceramic phase particles (e.g., metal carbides ($M_xC_y$), metal nitrides ($M_xN_y$), metal borides ($M_xB_y$), metal oxides ($M_xO_y$), metal carbonitrides ($M_xCN_y$), and mixtures of thereof) can be any shape. Some non-limiting examples include spherical, ellipsoidal, polyhedral, distorted spherical, distorted ellipsoidal, and distorted polyhedral shapes. Particle size is meant the measure of longest axis of the 3-dimensional shaped particles. Microscopy methods such as optical microscopy (OM) and scanning electron microscopy (SEM) can be used to determine the particle size.

Element 17: The ceramic phase imparts hardness to the multi-scale cermet and erosion resistance at temperatures in the range of about 300° C. to about 650° C.

By way of non-limiting example, exemplary combinations applicable to the embodiments described in this application may include any combination with one or more of Elements 1-17, described above.

To facilitate a better understanding of the embodiments of the present invention, the following examples of preferred or representative embodiments are given. In no way should the following examples be read to limit, or to define, the scope of the invention.

EXAMPLES

ThermoCalc® is a powerful and flexible software package based upon a Gibbs Energy Minimizer and developed for performing various kinds of thermodynamic and phase diagram calculations. It handles complex problems involving the interaction of many elements and phases and is specially designed for systems and phases that exhibit highly non-ideal behavior. The ThermoCalc® simulation may be used to determine effective amounts that should be used.

Figure 3:
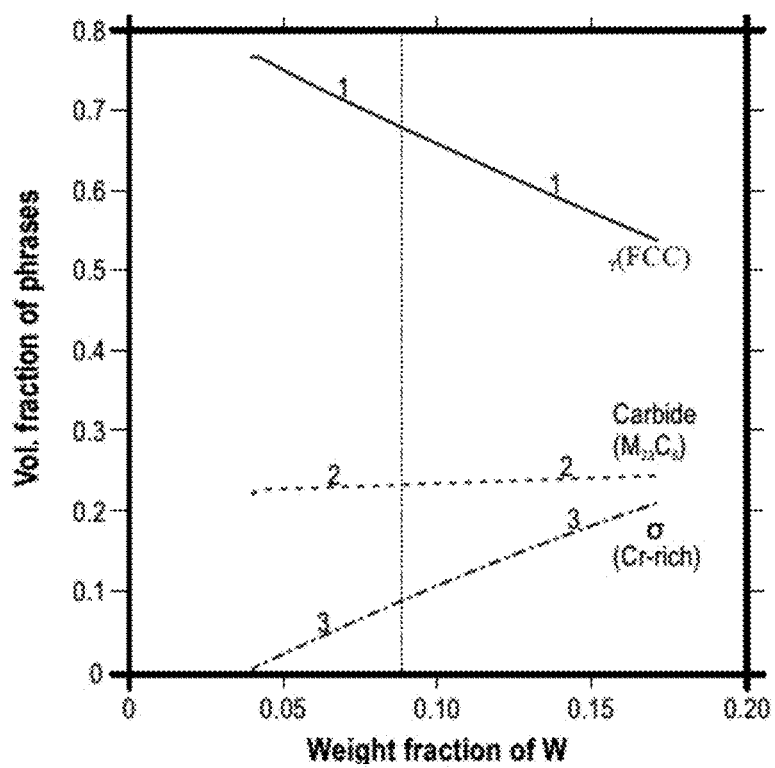
FIG. 3 is a graph depicting the volume fraction of various phases of the cermet from Example 1.

Example 1: ThermoCalc® simulation of the existing alloy phase, Bal.Co:10Ni:30Cr:1C:xW (wt. %), wherein x=4-17 wt. %. FIG. 3 shows volume fraction of various phases formed in the cermets after the existing alloy phase composition, Bal.Co:10Ni:30Cr:1C:xW (wt. %), wherein x=4-17 wt. %, is thermodynamically reached at equilibrium after long-term exposure at 600° C. Various phases include carbide ($M_{23}C_6$) ceramic phase, intermetallic Cr-rich σ-phase, and metal matrix γ(FCC) phase. This graph predicts volume fraction of each phase as a function of weight fraction of the added tungsten (W) at equilibrium. For instance, at the vertical line that marks 8.5 wt. % W, the expected volume fraction of each phase is: 68% metal matrix γ (FCC) phase, 9% Cr-rich σ-phase, and 23% $M_{23}C_6$ carbide phase. It is believed that the presence of 23% $M_{23}C_6$ carbide phase is responsible for superior abrasion and erosion resistance. However, chromium content in metal matrix γ (FCC) phase is expected to be about 11 wt. %. Since this is relatively low amount in chromium for use in metal dusting prone environments, the resulting cermets in the bimetallic material may subject to metal dusting corrosion after its chromium content in metal matrix γ (FCC) phase is depleted after long-term exposure at 600° C. Hence, there is still a need to increase this chromium content in metal matrix γ (FCC) phase while retaining a reasonable amount of the ceramic phase in the cermets of the bimetallic materials. At least in syngas related applications it is known that at least 25 wt. % Cr or preferably >30 wt. % Cr is needed in the metal matrix phase to ensure superior metal dusting corrosion resistance.

Figure 4:
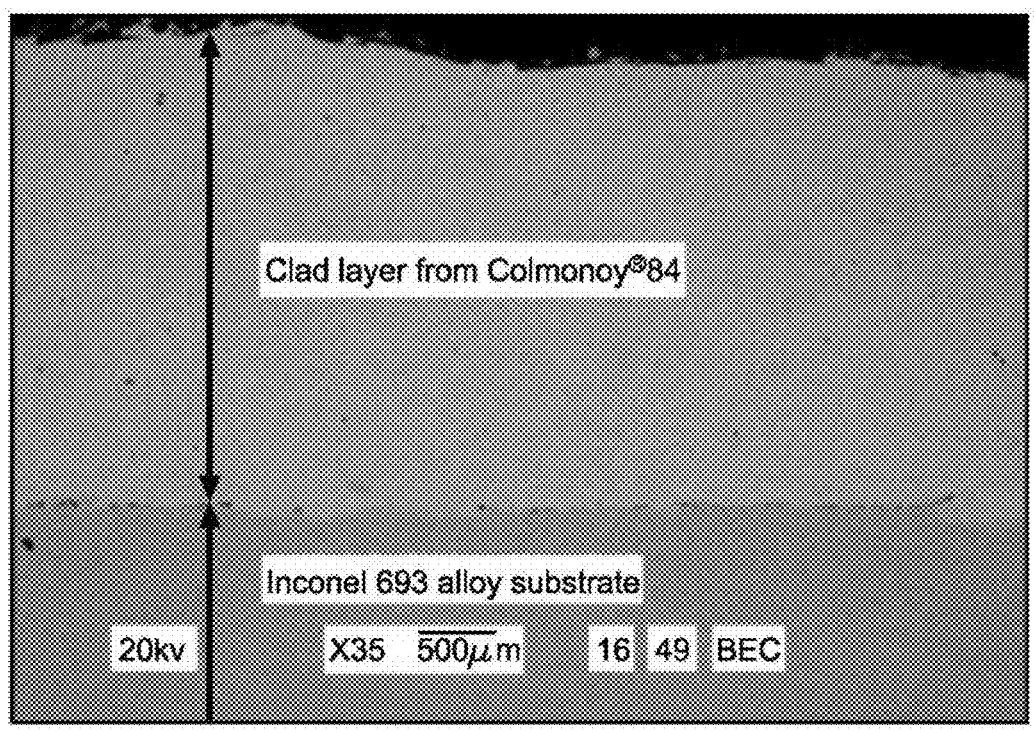
FIG. 4 is a cross-sectional SEM image of the bimetallic material from Example 2.

Example 2: A bimetallic material consisting of the cermets in-situ formed from Colmonoy® 84 and the Inconel 693 substrate. Colmonoy® 84 powder (Bal.Ni:29Cr:7.5W: 2.0Fe:2.4Si: 1.2C:1.4B) was laser cladded on Inconel 693 alloy substrate (Bal.Ni:4Fe:28Cr:3.1Al:0.7Nb), available from Special Metals. A crack-free, fully dense, and relatively thick (about 2 mm) bimetallic material was fabricated. FIG. 4 is a cross sectional scanning electron microscope (SEM) image that shows the laser cladded layer of the cermets formed in-situ from Colmonoy® 84 powder and a portion of the Inconel 693 alloy substrate just below the clad layer. During the laser cladding process, Colmonoy® 84 powder melts and solidifies on the Inconel 693 alloy substrate to form complete metallurgical bonding. Comparing to conventional thermal spray processes such as high-velocity oxy-fuel (HVOF) and plasma spray, laser cladding is particularly advantageous since dilution of alloy compositions at the interface is low, heat affected zone (HAZ) is minimal, and substrate deformation during the laser cladding process is also minimal.

Figure 5:
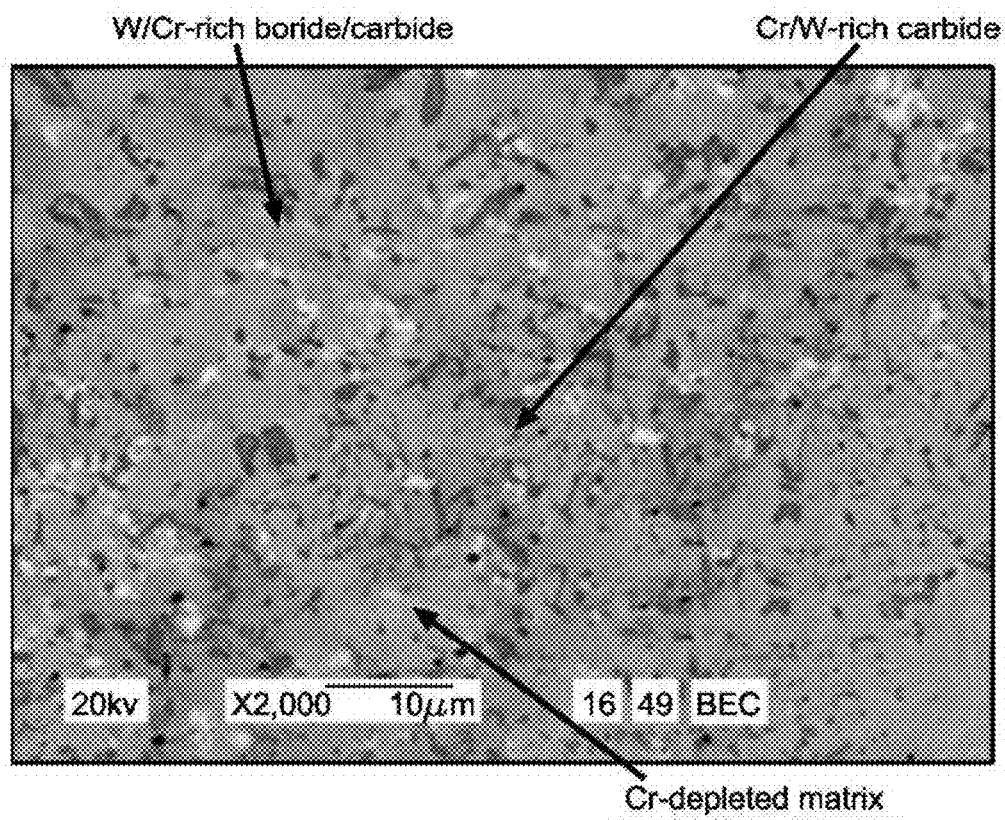
FIG. 5 is a cross-sectional SEM image of the clad layer from Example 2.

FIG. 5 is a cross sectional SEM image taken from the clad layer. It reveals further details of the cermets in-situ formed from Colmonoy® 84 powder. Two distinctively different ceramic precipitates are present, shown as white contrast dots and a black contrast phase. The former is a mixture of metal carbide ($M_xC_y$) and metal boride ($M_xB_y$) that are formed from the alloy phase (PQR) having alloying element Q (e.g., W and Cr) and ceramic forming elements R (e.g., C and B). Excluding carbon and boron, metal (M) in the mixture of metal carbide ($M_xC_y$) and metal boride ($M_xB_y$) is composed of 62.9 wt. % Cr, 27.4 wt. % W, and 9.7 wt. % Ni. Hence it is noted as a W/Cr-rich boride/carbide phase in the FIG. 5. The latter is primarily metal carbide ($M_xC_y$) that is formed from the alloy phase (PQR) having alloying element Q (e.g., W and Cr) and ceramic forming elements R (e.g., C). Excluding carbon, metal (M) in the metal carbide ($M_xC_y$) is composed of 61.4 wt. % Cr, 11.4 wt. % W, and 27.2 wt. % Ni. Hence it is noted as a Cr/W-rich carbide phase in the FIG. 5. By combining both W/Cr-rich boride/carbide phase and Cr/W-rich carbide phase, the ceramic phase of the cermets in-situ formed from Colmonoy® 84 powder constitute about 30 vol. % of the total volume of the cermet composition. The metal matrix phase of the cermets is depleted in Cr, e.g., 21 wt. % vs. 29 wt. % in powder due to in-situ formation of Cr-containing ceramic phases.

Figure 6:
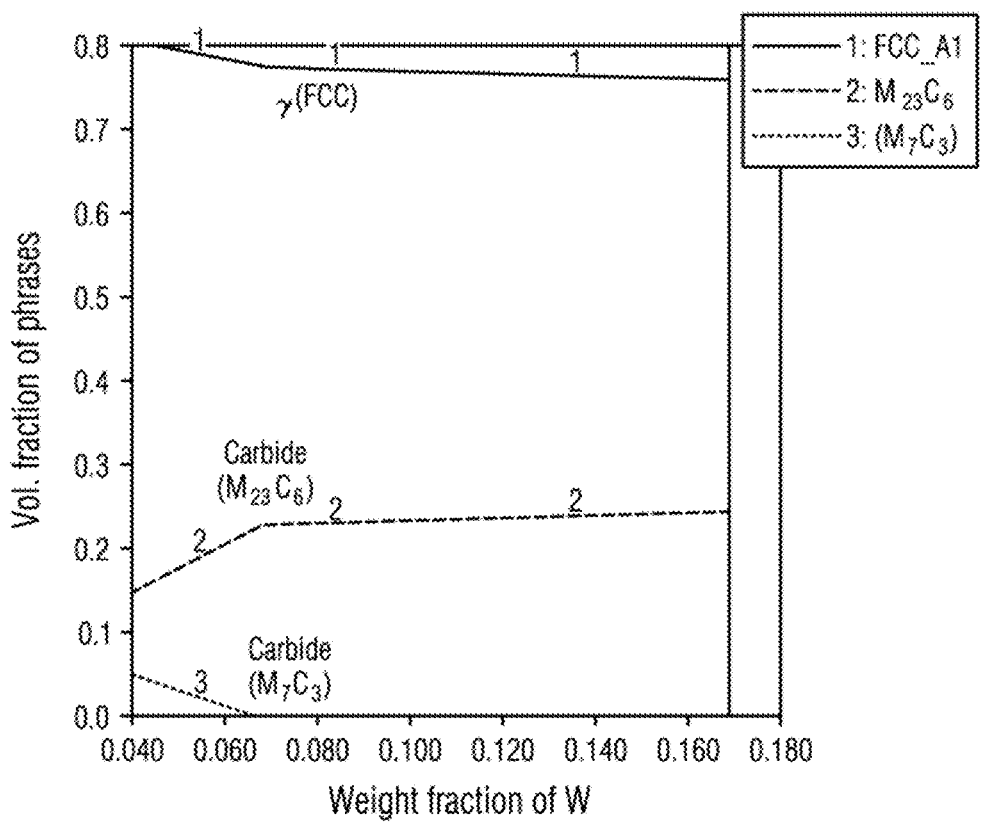
FIG. 6 is a graph depicting the volume fraction of various phases of the cermet from Example 3.

Example 3: ThermoCalc® simulation of the new alloy, Bal.Ni:30Cr:1.0C:xW (wt. %), wherein x=4-17 wt. %. FIG. 6 shows volume fraction of various phases formed in the cermets after the new alloy composition, Bal.Ni:30Cr:1.0C: xW (wt. %), wherein x=4-17 wt. %, is thermodynamically reached at equilibrium after long-term exposure at 600° C. Volume fraction of various phases including carbide ($M_{23}C_6$, $M_7C_3$) ceramic phase and metal matrix γ (FCC) phase is plotted as a function of weight fraction of the added tungsten (W). Up to about 7 wt. % W in this new alloy composition, Bal.Ni:30Cr:1.0C:xW (wt. %), both $M_{23}C_6$ and $M_7C_3$ carbides are present. However, above about 7 wt. % W, $M_7C_3$ carbide decomposes into $M_{23}C_6$. For instance, the vertical line in the graph represents one of the new alloys, EMS in Table 3, having a composition of Bal.Ni: 30Cr:1.0C:17.0W. The expected volume fraction of each phase at equilibrium after long-term exposure at 600° C. is: 77% metal matrix γ (FCC) phase and 23% $M_{23}C_6$ carbide phase. The presence of 23% $M_{23}C_6$ carbide phase is responsible for superior abrasion and erosion resistance. Also, comparing to a predominantly cobalt-base existing alloy in Example 1, chromium content in metal matrix γ (FCC) phase of the new alloy EMS is expected to be about 19 wt. %, which is about 8 wt. % higher than that in the cobalt-base existing alloy of Example 1. Since the higher chromium content in the metal matrix γ (FCC) phase is beneficial to metal dusting corrosion resistance, the new alloy compositions of the present disclose provide the improved metal dusting corrosion and abrasion/erosion resistance.

Figure 7:
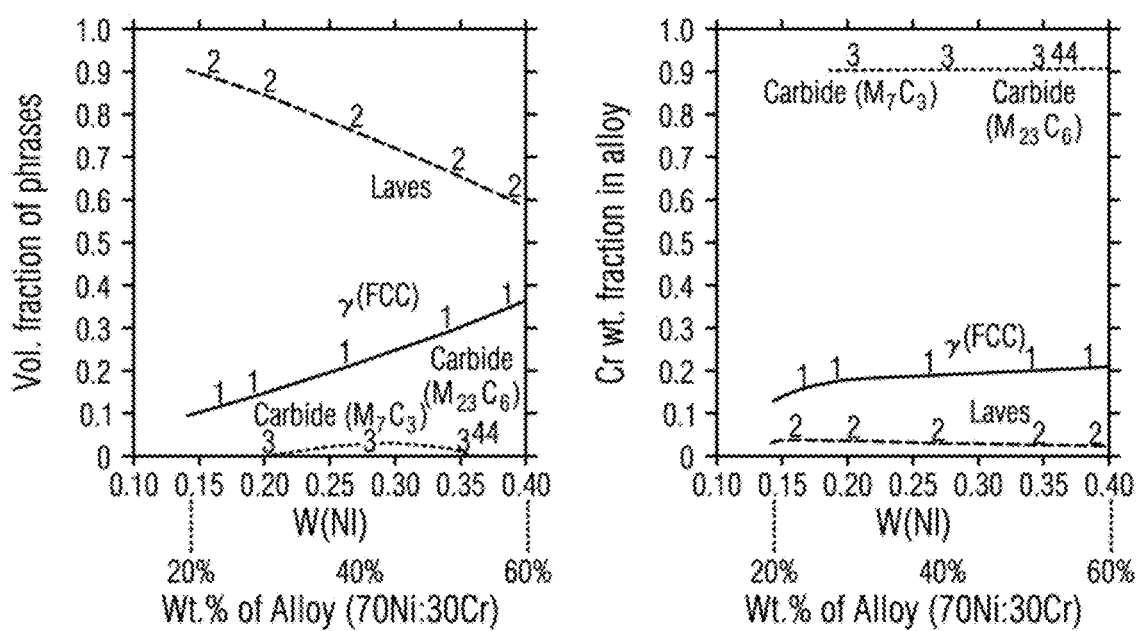
FIG. 7 is a graph depicting the volume fraction of various phases and the weight fraction of Cr in each phase of the cermet from Example 4.

Example 4: ThermoCalc® simulation of the cermets, TiC-x(70Ni:30Cr), wherein x=10-60 wt. % As an illustrative example, TiC is selected as a metal carbide ($M_xC_y$) phase and an alloy having a 70 wt. % Ni and 30 wt. % Cr (70Ni:30Cr) as a new alloy composition. The resulting cermet consisting of TiC and varying amount of 70Ni:30Cr alloy in the range of 10-60 wt. % is simulated by Thermo-Calc® software to evaluate its long-term stability at 600° C. FIG. 7 shows volume fraction of various phases formed in the cermets after the cermet composition, TiC-x(70Ni: 30Cr), wherein x=10-60 wt. %, is thermodynamically reached at equilibrium after long-term exposure at 600° C. Volume fraction of various phases including carbide ($M_{23}C_6$, $M_7C_3$) ceramic phase, Laves intermetallic phase, and metal matrix γ (FCC) phase is plotted as a function of weight percent of the added 70Ni:30Cr alloy. For instance, a cermet consisting of 40 wt. % TiC and 60 wt. % 70Ni:30Cr alloy will have 58 vol. % Laves intermetallic phase, 36 vol. % metal matrix γ (FCC) phase, and 6 vol. % $M_{23}C_6$ carbide phase. Also shown in FIG. 7 is weigh fraction of Cr in each phase of the cermets as a function of weight percent of 70Ni:30Cr alloy in the cermets. For a cermet consisting of 40 wt. % TiC and 60 wt. % 70Ni:30Cr alloy, the Cr content in the $M_{23}C_6$ carbide phase is about 91% and the Cr content in the Laves intermetallic phase is about 3 wt. %. Both $M_{23}C_6$ carbide phase and Laves intermetallic phase are responsible for superior abrasion and erosion resistance. The Cr content in metal matrix γ (FCC) phase of the cermet consisting of 40 wt. % TiC and 60 wt. % 70Ni:30Cr alloy is expected to be about 22 wt. %. Since the higher chromium content in the metal matrix γ (FCC) phase is beneficial to metal dusting corrosion resistance, the cermet compositions of the present disclose provide the improved metal dusting corrosion and abrasion/erosion resistance.

Figure 8:
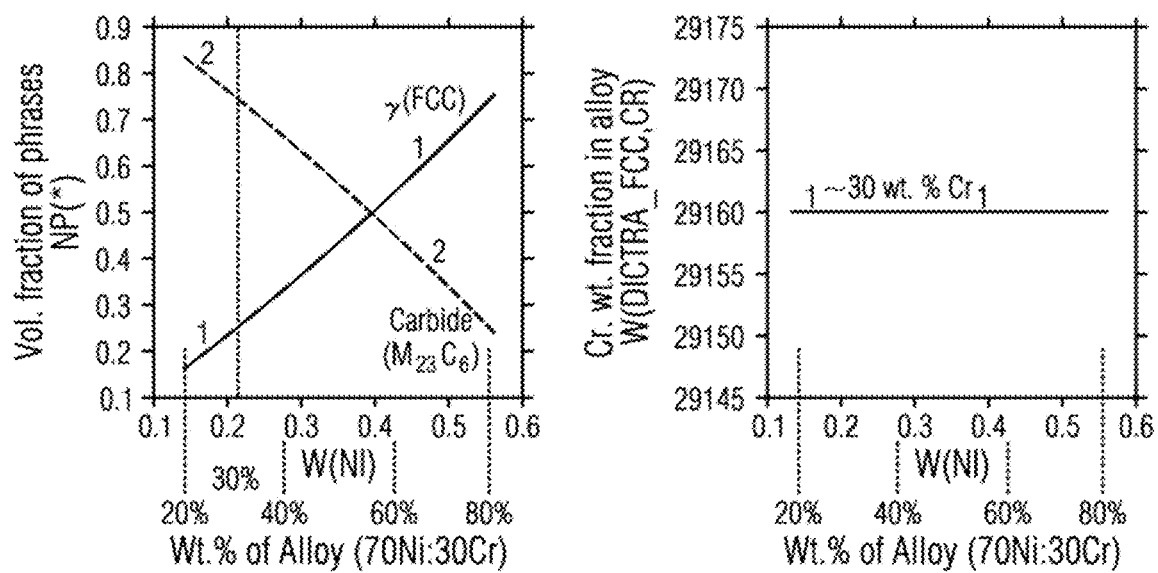
FIG. 8 is a graph depicting the volume fraction of various phases and the weight fraction of Cr in each phase of the cermet from Example 5.

Example 5: ThermoCalc® simulation of the cermets, $Cr_{23}C_6$-x(70Ni:30Cr), wherein x=20-80 wt. % As an illustrative example, $Cr_{23}C_6$ ceramic phase and a new alloy composition having a 70 wt. % Ni and 30 wt. % Cr (70Ni:30Cr) are used to make the cermets. The resulting cermet consisting of $Cr_{23}C_6$ and varying amount of 70Ni: 30Cr alloy in the range of 20-80 wt. % is simulated by ThermoCalc® software to evaluate its long-term stability at 600° C. FIG. 8 shows volume fraction of various phases formed in the cermets after the cermet composition, $Cr_{23}C_6$-x(70Ni:30Cr), wherein x=20-80 wt. %, is thermodynamically reached at equilibrium after long-term exposure at 600° C. Volume fraction of various phases including carbide ($M_{23}C_6$) ceramic phase and metal matrix γ (FCC) phase is plotted as a function of weight percent of the added 70Ni: 30Cr alloy. For instance, a cermet consisting of 70 wt. % $Cr_{23}C_6$ and 30 wt. % 70Ni:30Cr alloy will have 25 vol. % metal matrix γ (FCC) phase and 75 vol. % $M_{23}C_6$ carbide phase. The $M_{23}C_6$ carbide phase is responsible for superior abrasion and erosion resistance. Also shown in FIG. 8 is weigh fraction of Cr in each phase of the cermets as a function of weight percent of the 70Ni:30Cr alloy in the cermets. For the same cermet composition consisting of 70 wt. % $Cr_{23}C_6$ and 30 wt. % 70Ni:30Cr alloy, the Cr content in metal matrix γ (FCC) phase is expected to be about 30 wt. %. Also, the Cr content in the metal matrix γ (FCC) phase remains same as about 30 wt. % over the entire range of a new alloy composition from 20 wt. % to 80% in the cermets. Stating differently, regardless of weight percent of alloy in the cermets, the added 30 wt. % Cr in the new alloy composition retains in the cermets even after long-term exposure at 600° C. This proves excellent long-term microstructural stability of the cermets in the present invention. Since the higher chromium content in the metal matrix γ (FCC) phase is beneficial to metal dusting corrosion resistance, the cermet compositions of the present disclose provide the improved metal dusting corrosion and abrasion/erosion resistance.

Figure 9:
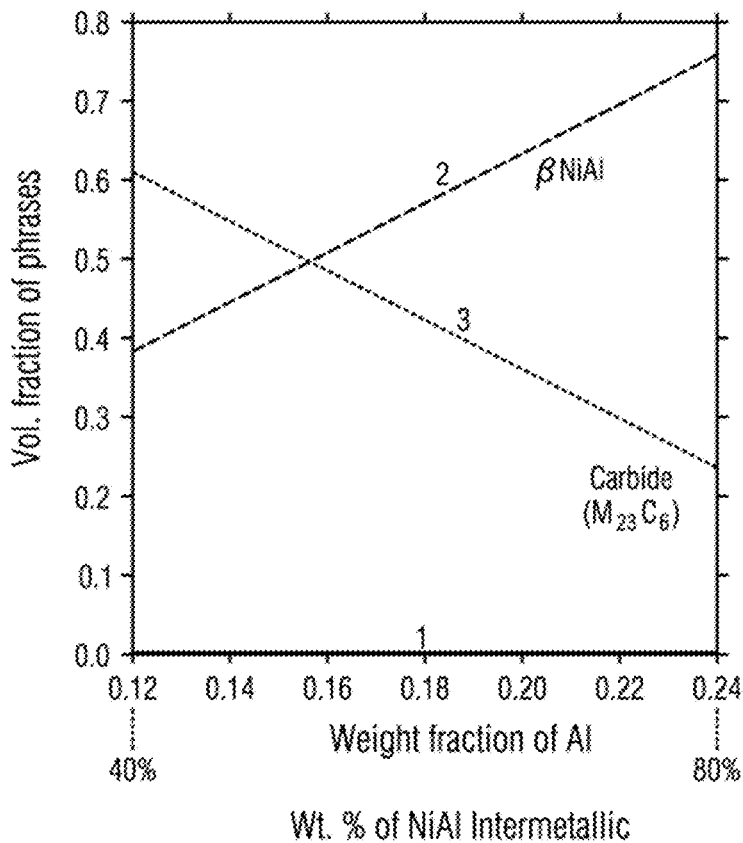
FIG. 9 is a graph depicting the volume fraction of various phases of the cermet from Example 6.

Example 6: ThermoCalc® simulation of the cermets, $Cr_{23}C_6$-xNiAl, wherein x=40-80 wt. % As an illustrative example, the $Cr_{23}C_6$ ceramic phase and the intermetallic β-NiAl alloy phase are used to make the cermets. The resulting cermet consisting of $Cr_{23}C_6$ and varying amount of intermetallic β-NiAl in the range of 40-80 wt. % is simulated by ThermoCalc® software to evaluate its long-term stability at 600° C. FIG. 9 shows volume fraction of various phases formed in the cermets after the cermet composition, $Cr_{23}C_6$-xNiAl, wherein x=40-80 wt. %, is thermodynamically reached at equilibrium after long-term exposure at 600° C. Volume fraction of various phases including carbide ($M_{23}C_6$) ceramic phase and intermetallic β-NiAl alloy phase is plotted as a function of weight percent of the added NiAl alloy. For instance, a cermet consisting of 60 wt. % $Cr_{23}C_6$ and 40 wt. % intermetallic β-NiAl alloy will have 61 vol. % $M_{23}C_6$ carbide phase and 39 vol. % intermetallic β-NiAl alloy. Stating differently the added $Cr_{23}C_6$ is very stable and does not decompose into the intermetallic β-NiAl alloy phase even after long-term exposure at 600° C. This proves excellent long-term microstructural stability of the cermets described herein. Since the intermetallic β-NiAl alloy phase provides excellent metal dusting corrosion resistance and the dispersed $Cr_{23}C_6$ carbide phase is responsible for superior abrasion and erosion resistance, the cermet compositions of the present disclose provide the improved metal dusting corrosion and abrasion/erosion resistance.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein.

While compositions and methods are described in terms of "comprising," "containing," or "including" various components or steps, the compositions and methods can also "consist essentially of" or "consist of" the various components and steps.

All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to about b," or, equivalently, "from approximately a-b") disclosed herein is to be understood to set forth every number and range encompassed within the broader range of values.

Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A laser cladded bimetallic material, comprising:
    (i) a high temperature alloy substrate, and (ii) a precipitated cermet composition comprising one or more metals, M, from a metal alloy binder,
    wherein the high temperature alloy substrate comprises a high temperature alloy substrate selected from the group consisting of (i) Ni-based, high Cr alloys, (ii) FeNi-based alloys, (iii) FeNiCo-based alloys, (iv) NiCo-based alloys, (v) Ni-based alloys, (vi) Steam Cracker Alloys, (vii) Austenitic Stainless Steels and mixtures thereof; wherein the precipitated cermet composition comprises:
    (a) at least one ceramic phase material selected from the group consisting of metal carbides ($M_xC_y$), metal nitrides ($M_xN_y$), metal borides ($M_xB_y$), metal oxides ($M_xO_y$), metal carbonitrides ($M_xCN_y$), and mixtures of thereof; wherein:
    wherein the one or more metals, M, is at least one element selected from a group consisting of titanium (Ti), Zirconium (Zr), Hafnium (Hf), Vanadium (V), Niobium (Nb), Tantalum (Ta), Molybdenum (Mo), Tungsten (W), Iron (Fe), Nickel (Ni), Cobalt (Co), Chromium (Cr), Aluminium (Al), Silicon (Si), Manganese (Mn), and mixtures of thereof;
    x is a whole or fractional numerical value ranging from 1 to 26; and
    y is a whole or fractional numerical value ranging from 1 to 6; and
    (b) at least one metal alloy binder phase corresponding to the metal alloy binder, wherein the at least one metal alloy binder phase comprising
        (i) about 28.0 to about 33.0 wt. % chromium (Cr);
        (ii) about 0.5 to about 2.9 wt. % carbon (C);
        (iii) about 4.1 to about 30.0 wt. % of an alloying element selected from the group consisting of Iron (Fe), Cobalt (Co), Aluminum (Al), Silicon (Si), Manganese (Mn), Copper (Cu), Titanium (Ti), Zirconium (Zr), Hafnium (Hf), Vanadium (V), Niobium (Nb), Tantalum (Ta), Molybdenum (Mo), Tungsten (W), and mixtures of thereof; and
        (iv) the balance being nickel (Ni),
    wherein the wt. % is based on the total weight of the alloy.

2. The laser cladded bimetallic material of claim 1, wherein the at least one metal alloy binder phase comprises from about 4.1 to about 18.0 wt. % of the alloying element.

3. The laser cladded bimetallic material of claim 1, wherein the ceramic phase comprises a metal carbide ($M_xC_y$).

4. The laser cladded bimetallic material of claim 1, wherein the ceramic phase of the precipitated cermet composition in the laser cladded bimetallic material constitutes about 5 vol. % to about 80 vol. % of the total volume of the precipitated cermet composition.

5. The laser cladded bimetallic material of claim 4, wherein the ceramic phase of the precipitated cermet composition in the laser cladded bimetallic material constitutes about 20 vol. % to about 60 vol. % of the total volume of the precipitated cermet composition.

6. The laser cladded bimetallic material of claim 1, wherein the laser cladded bimetallic material is a layer or insert of a dense fluidized bed (DFB) reactor component.

7. The laser cladded bimetallic material of claim 1, wherein M is selected from the group consisting of Tungsten (W), Molybdenum (Mo), Titanium (Ti), Chromium (Cr), and mixtures of thereof.

8. The laser cladded bimetallic material of claim 1, wherein the ceramic phase material constitutes about 5 vol. % to about 80 vol. % of the total volume of the precipitated cermet composition.

9. The laser cladded bimetallic material of claim 1, wherein the at least one metal alloy binder phase has a nominal composition (wt. %) selected from the group consisting of:

Bal.Ni:28Cr:7W:3.5Ta:0.3Ti:0.5Zr:0.6C
Bal.Ni:30Cr:13W:2.5C
Bal.Ni:28.5Cr:4.6W:1.2C
Bal.Ni:30Cr:8.5W:1.45C
Bal.Ni:30Cr:17.0W:1.0C
Bal.Ni:32.5Cr:17.5W:2.55C
Bal.Ni:32Cr:13.0W:2.5C; and
Bal.Ni:29Cr:7.5W:2.4Si: 1.2C.

10. The method of claim 1, wherein the precipitated cermet composition of the laser cladded bimetallic material comprise less than 3 volume (vol.) % porosity.

11. The method of claim 1, wherein the precipitated cermet composition of the laser cladded bimetallic material comprise less than 1 volume (vol.) % porosity.

12. The method of claim 1, wherein the precipitated cermet composition comprises metal carbides ($M_xC_y$).

13. The method of claim 1, wherein the precipitated cermet composition comprises metal nitrides ($M_xN_y$).

14. The method of claim 1, wherein the precipitated cermet composition comprises metal borides ($M_xB_y$).

* * * * *